US006390756B1

(12) United States Patent
Isaacs et al.

(10) Patent No.: US 6,390,756 B1
(45) Date of Patent: May 21, 2002

(54) TRANSFER OF CARTRIDGES CONTAINING FLAT ARTICLES

(75) Inventors: Gerald A. Isaacs; Luiz C. Harres, both of Arlington; John W. Kulas, Euless; Joseph C. Rotenberry, Bedford; Kenneth A. McKee, Irving; Lynn V. Hill, Fort Worth; Mark L. Carlile, Carrollton; Richard C. Hickey, Plano; Charles M. Combs, Cedar Hill; Harold G. Burkett, Jr., Carrollton, all of TX (US)

(73) Assignee: Siemens Dematic Postal Automation, L.P., Arlington, TX (US)

( * ) Notice: Subject to any disclaimer, the term of this patent is extended or adjusted under 35 U.S.C. 154(b) by 0 days.

(21) Appl. No.: 09/633,368

(22) Filed: Aug. 7, 2000

Related U.S. Application Data

(63) Continuation of application No. 08/828,949, filed on Oct. 29, 1997, now Pat. No. 6,135,697.

(51) Int. Cl.[7] .................................................. B65G 1/04

(52) U.S. Cl. ....................... 414/281; 414/286; 414/280; 414/798.2; 414/273; 414/416.01; 414/798.9; 53/382.1; 53/235; 209/200; 209/909; 209/552

(58) Field of Search .......................... 211/51, 59.3, 10; 312/71, 50; 209/900, 909, 552, 922, 546; 232/17, 18, 1 D; 271/149, 210, 150, 220, 221; 414/266, 267, 268, 277, 807, 282, 281, 403, 283, 286, 411, 416.01, 222.01, 273, 798.9, 280, 800, 810, 811, 798.6, 798.2; 53/382.1, 235

(56) References Cited

U.S. PATENT DOCUMENTS

| | | | | | |
|---|---|---|---|---|---|
| 4,756,657 | A | * | 7/1988 | Kinney | 414/280 X |
| 5,009,321 | A | | 4/1991 | Keough | 209/3.1 |
| 5,042,667 | A | | 8/1991 | Keough | 209/3.1 |
| 5,143,225 | A | | 9/1992 | Rabindran et al. | 209/584 |
| 5,190,282 | A | | 3/1993 | Rabindran et al. | 271/272 |
| 5,363,971 | A | | 11/1994 | Weeks et al. | 209/584 |
| 5,385,243 | A | | 1/1995 | Jackson et al. | 209/509 |
| 5,405,232 | A | | 4/1995 | Lloyd et al. | 414/280 |
| 5,470,427 | A | * | 11/1995 | Mikel et al. | 209/900 X |
| 5,833,076 | A | | 11/1998 | Harres et al. | 211/51 |
| 5,857,830 | A | | 1/1999 | Harres et al. | 414/798.9 |
| 5,947,468 | A | | 9/1999 | McKee et al. | 271/210 |
| 5,993,132 | A | | 11/1999 | Harres et al. | 414/417 |
| 6,026,967 | A | | 2/2000 | Isaacs et al. | 209/539 |

FOREIGN PATENT DOCUMENTS

| | | | | |
|---|---|---|---|---|
| JP | 5-116708 | * | 5/1993 | 414/281 |

* cited by examiner

*Primary Examiner*—Frank E. Werner
(74) *Attorney, Agent, or Firm*—Edward Jorgenson; Philip G. Meyers; Intellectual Property Law, P.C.

(57) ABSTRACT

An apparatus for automatically transferring and handling cartridges containing flat articles. The method and apparatus robotically transfers filled cartridges from the output compartments of a sorting machine to a buffer shelf; and from the buffer shelf to a docking station of a cartridge unloader and automatic feeder to the input of the sorting machine, and for transferring empty cartridges from the docking station to either the buffer or the output compartments of the sorter, is provided.

21 Claims, 24 Drawing Sheets

TRANSFER OF CARTRIDGES CONTAINING FLAT ARTICLES

This application is a continuation of U.S. application Ser. No. 08/828,949, U.S. Pat. No. 6,135,697, issued Oct. 24, 2000, which application is a conversion of U.S. application Ser. No. 08/625,792, filed Mar. 29, 1996, now abandoned, which was converted to a provisional application by Petition to Convert Non-Provisional Application to a Provisional Application Pursuant to 37 C.F.R. §1.53(b)(2)(ii), application Ser. No. 60/041,428, filed Mar. 29, 1996, now abandoned.

FIELD OF THE INVENTION

The present invention relates to automated handling of flat articles, particularly automated feeding to and removal of flat articles from a sorting or other flat article processing machine.

BACKGROUND OF THE INVENTION

Machines for automatically sorting flat articles, such as mail, into one of an array of selected bins or compartments, are known. Typically, such sorting machines have a feeding station, including an intake drive member such as a rubber-covered wheel or belt, sensing and detecting equipment for determining the appropriate output compartment for the article to be sorted, diverting gates or other mechanisms and an array of output compartments or bins for the sorted articles. An example of an advanced sorting machine is the DBSCll sorting device, available from ElectroCom Automation, L.P., Arlington, Texas.

Conventionally, to feed articles into the sorting machine, an operator manually grabs a bundle of mail to be sorted and manually shakes or jostles the mail to generally align the bottom edges, making a stack, typically horizontal. The operator then places the stack of mail against the feed member of the sorting machine, which then feeds the articles into the sorting machine, one at a time, to be sorted.

At the output of the sorter, the sorted articles are routed to the appropriate compartment for each of the sorted articles and stacked. The feeding and sorting of articles continues until one or more of the receiving compartments becomes sufficiently full of a stack of sorted mail. At this point, an operator will manually remove a stack of the sorted articles from the compartment and place the articles into a box for either later reprocessing through the sorting machine, transferring to another sorting machine for further sorting or transporting to a delivery person, such as a mail carrier, for ultimate delivery to the intended location, if all sorting is completed.

Although automatic sorting machines have greatly speeded and improved the prior process of manual sorting, manual attention is still required to feed the flat articles into the sorting machine and to retrieve the sorted articles from the output of the sorting machine. The need for such manual feeding and sweeping is undesirable for ergonomic reasons, because of the bending and reaching required. Furthermore, the need for such manual handling of the mail tends to limit the maximum benefits of automation that can be gained from the sorting machine.

OBJECTS OF THE INVENTION

Accordingly, it is an object of the present invention to minimize the ergonomic problems and reduce manpower requirements by automating the feeding and retrieving of flat articles from a flat article sorting machine or other flat article processing machine.

It is a further object of the present invention to provide a cartridge for receiving and holding the flat articles in an orderly manner, which can be readily handled and transferred by either a robotic cartridge handling and transfer device or by a human operator, if necessary.

It is a further object of the present invention to provide a cartridge that will readily dock onto a receiving dock of a feeding device and can be inserted into the output compartments of a sorting machine to directly receive sorted articles in an orderly stack, so that the cartridge containing the stacked flat articles is readily removed from the sorting machine.

It is a further object of the present invention to provide an automatic unloading apparatus and method for removing stacks of flat articles from a cartridge and for queuing the stacks for feeding to a sorting machine.

It is a further object of the present invention to provide a method and apparatus for automatically stacking flat articles into a cartridge at the output of a sorting machine.

It is a further object of the present invention to provide a robotic cartridge transfer system for automatically removing cartridges containing a stack of flat articles from the output compartment of a sorting machine, when the cartridge has reached a desired stage of filling, and to transfer the cartridge to a buffer storage shelf or the receiving dock of the same or a different sorting machine for resorting.

It is a further object of the present invention to provide a feed-through jogging/edging apparatus for automatically edging flat articles prior to entrance to a document feeder.

It is a further object of the present invention to provide a system for dynamic compartment allocation that automatically redesignates a different output location when it is desired to remove a cartridge filled with sorted articles so that the sorting machine continues to sort into the redesignated output location even when designated output compartments have been filled, when the cartridge has either not yet been removed or is still in the process of being removed from the output compartment of the sorting machine.

It is a further object of the present invention to provide a system for allocation of output compartments which groups high-occurrence destinations together to maximize efficiency of cartridge removal, based on probability of occurrence of the particular destinations.

SUMMARY OF THE INVENTION

Cartridge

In accordance with the present invention, a cartridge for stacked flat articles includes:

a container comprising a bottom, sides and an openable front door supporting a stack of flat articles, a longitudinally slidably mounted stack support paddle resiliently urgable against the stack of articles, said stack support paddle further including actuators for external sensors for determining the position of said stack support paddle.

In a preferred embodiment, the cartridge further includes a lock for selectively securing the stack support paddle to prevent movement of stack support paddle when the lock is engaged, the lock including an external actuator for disengaging the lock when the cartridge is mounted in a cartridge receiving dock and disengaging the lock when the cartridge is removed from the receiving dock.

In a further preferred embodiment, the door includes a cam follower for opening and closing the door as a result of relative movement between a fixed external cam and the cam follower.

Autofeeder

In accordance with a preferred embodiment of the present invention, a method for transferring a stack of flat articles from a cartridge having an openable door includes:

placing a cartridge onto a cartridge receiving dock;

opening the cartridge door while supporting the stack of articles; placing a front stack support finger that moves with the stack to support the stack of flat articles engaging the stack of articles with a movable paddle; and moving the paddle forwardly to push the stack forwardly, while supporting the front of the stack with the front stack support finger to retain the stack of flat articles between the front stack support finger and the movable paddle during movement of the stack from the cartridge.

The method further comprises:

moving a rear stack support finger between the movable paddle and the rear of the stack of flat articles; moving the front and rear stack support fingers with the stack retained between thereby moving the stack behind a previously queued stack of articles the moved stack becoming a newly queued stack;

moving a queued stack support from between the previously queued stack and the newly queued stack to a position behind the newly queued stack; and moving the front and rear fingers back to respective starting positions.

In accordance with a preferred embodiment of the present invention, apparatus for transferring a stack of flat articles from a cartridge having an openable door includes:

hold bars for supporting the front of the stack of flat articles when the door is opened;

a cam and cam follower for opening the door when the hold bars are in place;

front fingers for supporting the front of the stack during removal thereof from the cartridge; and a pusher for pushing the stack forwardly, to cause the stack to be moved from the cartridge.

In accordance with the present invention, the apparatus further comprises:

rear fingers for supporting the rear of the stack of flat articles;

a queuing station, including a queued stack support for supporting the rear of a queued stack of flat articles;

In accordance with a preferred embodiment of the present invention, there is provided an apparatus for transferring a stack of flat articles from a cartridge having an openable door and a longitudinally slidable rear stack support paddle for supporting a rear of the stack, and queuing the stack for feeding to a flat article processing machine, further including:

a movable mechanical arm for placing the cartridge on and removing the cartridge from a receiving dock;

hold bar for supporting the front of the stack while the door is opened;

a cam for opening the door by means of relative movement between a cam on the receiving dock and a cam follower on the door as the cartridge is placed on the receiving dock and for closing the door when the cartridge is removed from the receiving dock;

a front finger for supporting the front of the stack during removal thereof from the cartridge;

a drive for placing the front finger in front of the stack for support thereof when the hold bar is removed;

a pusher positionable behind the stack of flat articles; and a drive for moving the pusher forwardly, to push the stack forwardly, to move the stack out of the cartridge.

In accordance with the invention, the apparatus further comprises:

a drive for moving the front finger from the receiving dock to a queuing station along with the stack of flat articles;

a rear finger for supporting the rear of the stack;

a drive for placing the rear finger between a longitudinally slidable rear stack support paddle and the rear of the stack;

a queuing station, including a queued stack support for supporting the rear of a queued stack;

a drive for moving the rear finger with the stack, to retain the stack between the front finger and the rear finger during movement;

a drive for moving the queued stack support from between a previously queued stack and a newly queued stack to a position behind the newly queued stack; and a drive for moving the front and rear fingers away from the stack to permit movement of the front and rear fingers to respective starting positions.

Autostacker

In accordance with a preferred embodiment of the present invention, a method for transferring flat articles from an article processing machine to a cartridge in an output compartment includes:

moving articles toward an open end of a cartridge docked at an output compartment, said cartridge having a longitudinally slidable rear stack support paddle;

guiding the articles into the cartridge to form a stack of articles in the cartridge;

determining when the cartridge should be removed from the output compartment;

discontinuing the movement of articles into the cartridge when the cartridge is to be removed from an output compartment;

closing a door of the cartridge while supporting the stack in an upright position; and removing the cartridge from the output compartment.

In accordance with another embodiment of the present invention, an apparatus for transferring flat articles from an article processing machine to a cartridge in an output compartment includes:

a transport for moving articles toward an open end of a cartridge docked at an output compartment, said cartridge having a longitudinally slidable rear stack support paddle;

an article guide for guiding articles into the cartridge in a stack of articles in the cartridge;

a sensor for determining when a cartridge should be removed from the output compartment;

a controller for discontinuing the movement of articles to the cartridge when the cartridge is to be removed from an output compartment;

an actuator for closing a door to the cartridge while supporting flat articles in the stack in an upright condition; and a drive for removing said cartridge from said output compartment.

Further in accordance with the present invention, an apparatus for transferring flat articles from an article processing machine to a cartridge in an output compartment includes:

a drive for moving articles toward an open end of a cartridge docked at an output compartment, said cartridge having a longitudinally slidable rear stack support paddle;

a sweep gate for guiding articles into the cartridge in a stack of articles in the cartridge;

a sensor for determining when a cartridge should be removed from the output compartment;

an actuator for discontinuing the movement of articles to the cartridge when the cartridge is to be removed from an output compartment;

a cam on the output compartment for closing the cartridge door by means of relative movement between the cam and the door; and a mechanical arm for removing the cartridge from the output compartment.

Jogger

In accordance with an embodiment of the present invention, apparatus for aligning the bottom edges of flat articles includes: a plurality of spaced apart, generally vertical fingers, forwardly translatable while supporting groups of flat articles, each finger being rockable back and forth through a vertical centerline as the fingers are forwardly translated to jostle the articles to align the bottom edges thereof.

Also in accordance with the present invention, the apparatus as defined above further comprises a plurality of fixed cam lobes, with the fingers having a cam follower mounted thereon to ride over the cam lobes as the fingers are forwardly translated, thereby to impart a back and forth rocking motion through a vertical centerline as the fingers are forwardly translated.

Robot

In accordance with an embodiment of the present invention, apparatus for automatically inserting and removing cartridges from an article processing machine includes: a cartridge holding platform;

an X—Y positioning device mounted to the cartridge holding platform for positioning the cartridge holding platform at a specified location for delivering or retrieving a cartridge;

a cartridge capturing arm including extendible arms for extending to and supporting the cartridge; and a drive for moving a hold bar into and out of the cartridge.

Further in accordance with the present invention, the cartridge holding platform is rotatable about a vertical axis.

Also in accordance with the present invention, the cartridge holding platform is rotatable about a horizontal axis to align the extendible arms with the cartridge.

Further in accordance with the present invention, the X—Y positioning device comprises a robot that includes an end effector for actuating a stack shover into an output compartment.

Overall System with Buffer

In accordance with an embodiment of the present invention, a method for sorting and feeding flat articles includes: placing a cartridge retaining a stack of flat articles onto a cartridge receiving dock;

removing the articles from the cartridge as a group;

moving the articles as a group to a feeding station of a sorter;

sorting the articles to selected ones of a plurality of output compartments, each of the output compartments having a cartridge contained therein;

moving articles into a selected cartridge in one of said plurality of compartments and as a stack in the cartridge;

sensing when the cartridge should be removed from an output compartment; and discontinuing movement of articles into the cartridge when the cartridge is to be removed from an output compartment.

In accordance with this embodiment, the method further comprises:

moving the cartridge from the output compartment to a buffer shelf for temporary storage.

Further in accordance with the present invention, an apparatus for sorting and feeding flat articles includes: a cartridge receiving dock receiving a cartridge holding a stack of flat articles;

a pusher for removing articles as a group from the cartridge;

a transport for moving groups of articles to a feeding station of a sorter;

an article sorter for sorting articles to selected ones of a plurality of output compartments, each of the output compartments having a cartridge contained therein;

a transport for driving articles into a selected cartridge in one of the plurality of compartments to a stack in the cartridge;

a sensor for determining when a cartridge should be removed from an output compartment; and a controller for discontinuing the movement of articles into the cartridge for removal from an output compartment.

In accordance with this embodiment, the apparatus further comprises a platform for removing the cartridge from an output compartment and placing the cartridge in a buffer shelf.

Also in accordance with the present invention, an apparatus for sorting and feeding flat articles includes:

a cartridge having a longitudinally slidable rear stack support paddle for supporting the rear of a stack of flat articles;

a mechanical arm for positioning the cartridge, containing a stack of flat articles, at a cartridge receiving dock;

a cam for opening a door of said cartridge by means of relative movement between the cartridge and the cartridge receiving dock;

a hold bar insertable into the cartridge between the door and a front of the stack of articles for supporting the front of the stack to maintain a desired orientation of the stack;

a front finger positionable at the front of the stack of flat articles and a rear finger positionable at the rear of the stack;

a drive for moving the hold bar away from the stack prior to moving the stack of flat articles from the cartridge;

a drive for moving the front and rear fingers from the cartridge to move the stack of flat articles to a feeder station;

a feeder for feeding articles from a queued stack into a sorter having a plurality of output compartments, each output compartment having a cartridge therein;

a drive for moving said articles into a selected cartridge in one of the plurality of compartments;

a sweep gate for guiding articles into a cartridge as a stack of articles in the cartridge;

a sensor for when a cartridge should be removed from an output compartment;

a controller for disabling the movement of articles into the cartridge when the cartridge is to be removed from an output compartment;

an actuator for moving the sweep gate to a front of the stack;

a cam on the output compartment for closing the cartridge door by means of relative movement between the cam and the door; and a mechanical arm for removing the cartridge from an output compartment for placement in a buffer shelf.

Also in accordance with the present invention, a method for sorting articles into cartridges includes: determining the frequently used output compartments containing cartridges; and designating the most frequently used output compartments proximate to one another.

Further in accordance with this embodiment, the method further allocating compartments in a buffer shelf proximate to one another for receiving cartridges from the most frequently used output compartments.

BRIEF DESCRIPTION OF THE DRAWINGS

For a more complete understanding of the present invention and the advantages thereof, reference is now made to the following DETAILED DESCRIPTION taken in conjunction with the accompanying drawings in which.

DETAILED DESCRIPTION

Figure 2:
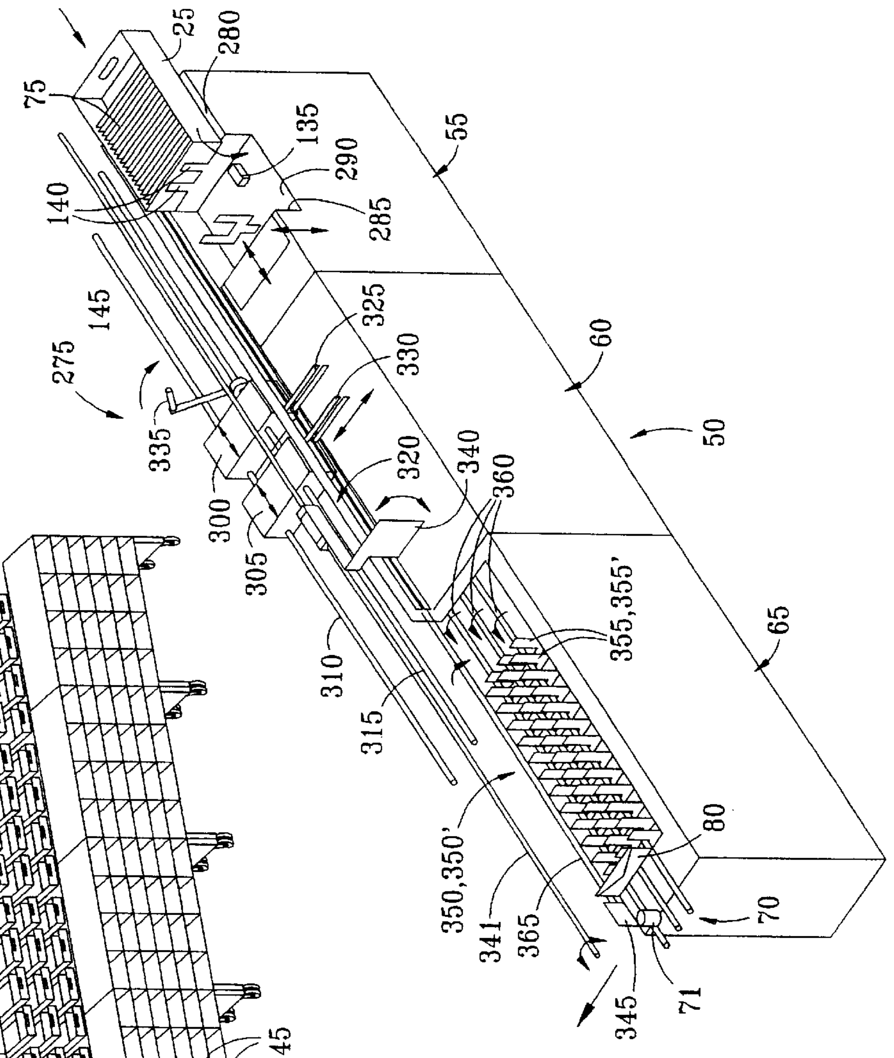
FIG. 2 is a perspective view of an autofeeder system for the mail sorting machine of FIG. 1.
Figure 1:
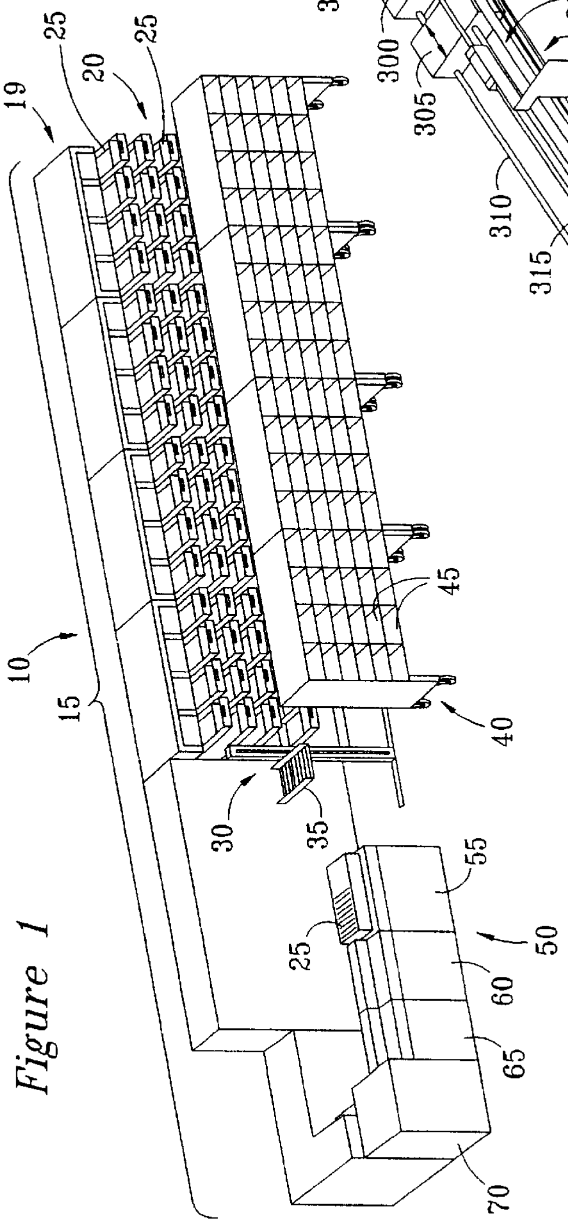
FIG. 1 is a perspective view of a mail cartridge handling system in accordance with the present invention, for a mail sorting machine.

Referring now to the drawings in detail, wherein like reference characters designate like or similar parts throughout the views, and initially to FIGS. 1 and 2 thereof, a flat article handling system 10 is depicted. The article handling system 10 includes a sorter 15 and an array 19 of output compartments 20 arranged in rows and columns, each being adapted to receive a cartridge 25 into which mail (or other flat articles) may be automatically stacked. The article handling system 10 also includes an X—Y cartridge transfer and handling robot 30 having a cartridge support platform 35 for transferring cartridges between components of the system. The article handling system 10 preferably also includes a buffer shelf 40 (the rear is depicted in FIG. 1) having an array of compartments 45 for temporarily receiving and storing filled and unfilled cartridges 25. The article handling system 10 also preferably includes an autofeeder 50, including a cartridge docking station 55, a queuing station 60, and a jogging/edging station 65 leading to a feeding station 70. It will be understood that, although, for convenience, the term "mail" will often be used herein to refer to the flat articles being handled in accordance with the method and apparatus of the present invention, it is to be expressly understood that flat articles other than mail, including, for example, magazines and books, can also be handled.

The major components of the system will now be described in turn, beginning with the construction of a cartridge 25.

Cartridge

Referring now to FIGS. 3A–3D, 4A, 4B and 5, cartridge 25 is designed to hold a horizontal stack 75 (FIG. 2) of pieces of mail (or other flat articles), to interface with the other parts of the system and to facilitate manipulation by the X—Y cartridge transfer and handling robot 30. The cartridge 25 can also be readily manipulated, carried and moved by humans, when desired.

The cartridge is generally rectangular, with a generally flat bottom 82, generally flat side walls 85 and 86, a cartridge door 90 pivotable downwardly on hinges 95 at a front end 100, and a handle 105 at a rear end 110. Preferably, the cartridge door 90 is spring-loaded by a spring 112 into the closed position. The handle 105 may simply be a bar, leaving the rear end 110 otherwise open. The rear end 110 may also be closed with a wall, if desired, but such is not required. Preferably, the cartridge 25 is in the range of about 23 inches long, 13 inches wide and 5 ⅜ inches high, and holds from 0 to 18 inches of stacked mail. Of course, any convenient size of cartridge can also be used, depending upon the flat articles to be handled and the capacity desired.

Figure 5:
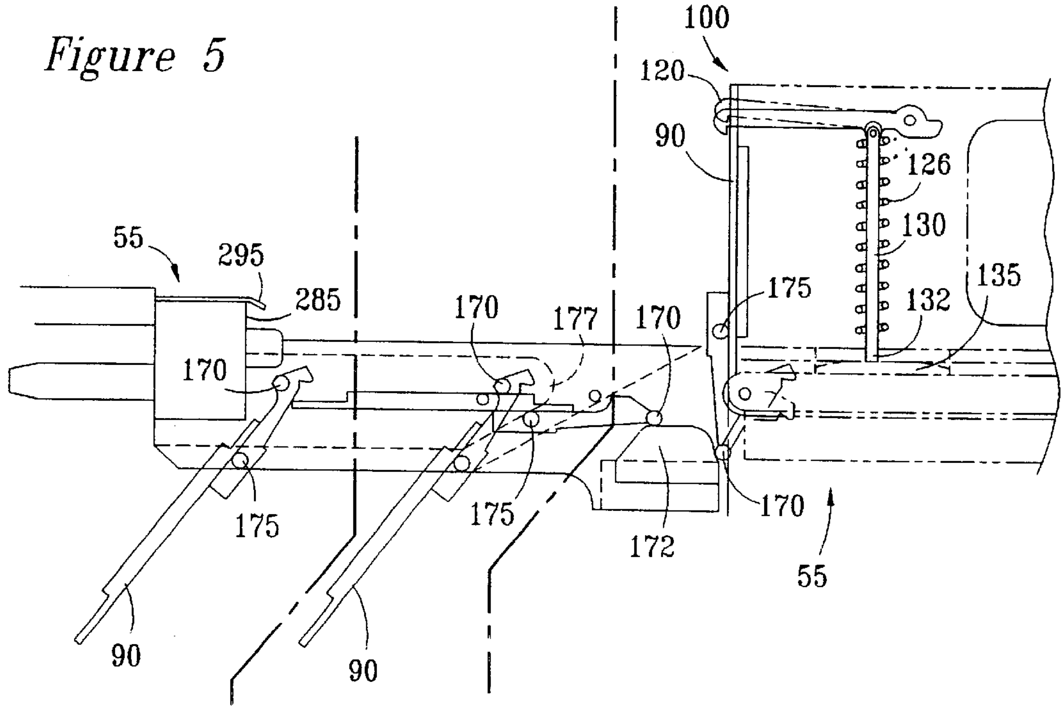
FIG. 5 is a side view, partly in phantom, of the front portion of a cartridge of FIG. 3A illustrating the sequence of opening of the cartridge door in three stages: 1) with the door closed, as the cartridge reaches the receiving dock; 2) with the door opening by means of a cam on the receiving dock as the cartridge is moved further onto the receiving dock; and 3) with the door fully opened when the cartridge is fully docked on the receiving dock.

The cartridge door 90 preferably covers the entire front end 100 of the cartridge 25 so that when the door is open, a stack of mail can be removed without obstructions or edges to "catch" the pieces of mail. The cartridge door 90 includes a latch bar 115 on the left and right upper corners, which is adapted to mate with a latch 120 pivotally mounted in a latch housing 125 on either side of the cartridge 25. As best illustrated in FIG. 5, a latch release 130 (preferably a push rod) is retained within the latch housing 125, and spring-loaded by means of a spring 126 to urge the latch 120 into the closed position. As shown in FIG. 5, the bottom end 132 of the latch release 130 extends through the bottom of the latch housing 125.

As seen in FIG. 5, as a cartridge 25 is inserted in the cartridge docking station 55 (or into an output compartment 20 in the article handling system 10 the bottom end 132 of the latch release 130 rides over a ramp or unlocking cam 135 on the cartridge docking station 55, and is pushed upward, thus lifting latch 120 and releasing the cartridge door 90 so that it can be opened.

Figure 3A:
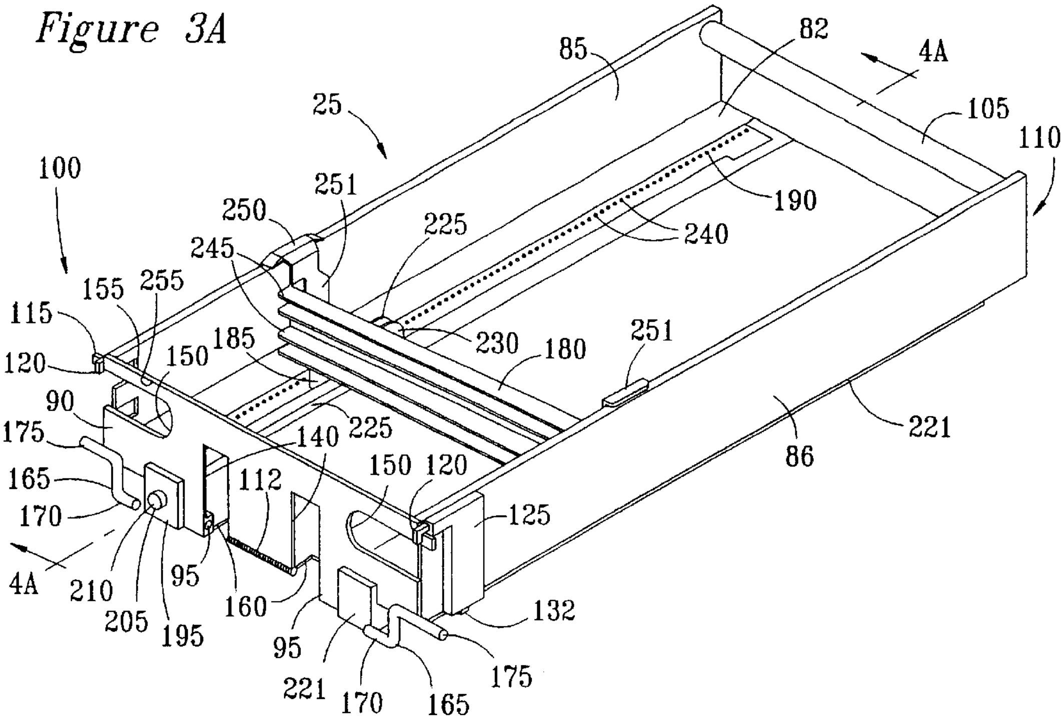
FIG. 3A is a perspective view of a cartridge for use in the autofeeder system of FIG. 2, depicted with the cartridge door closed.
Figure 3B:
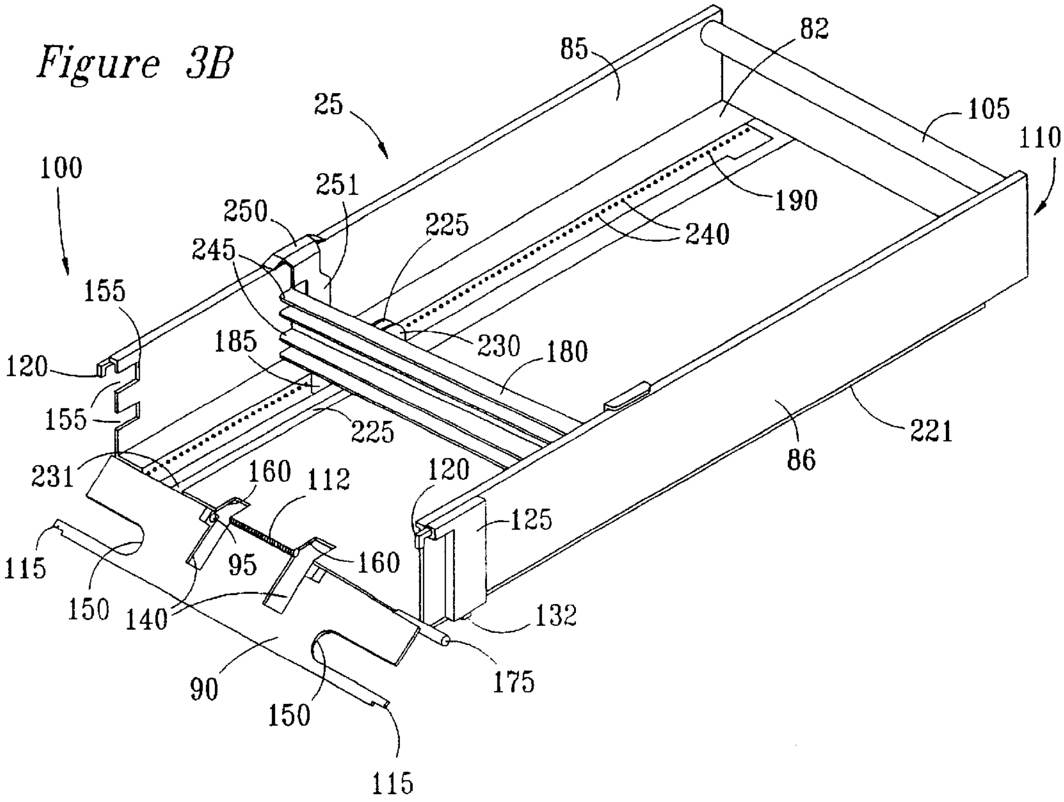
FIG. 3B is a perspective view of the cartridge of FIGURE 3A, with the- cartridge door opened.
Figure 3C:
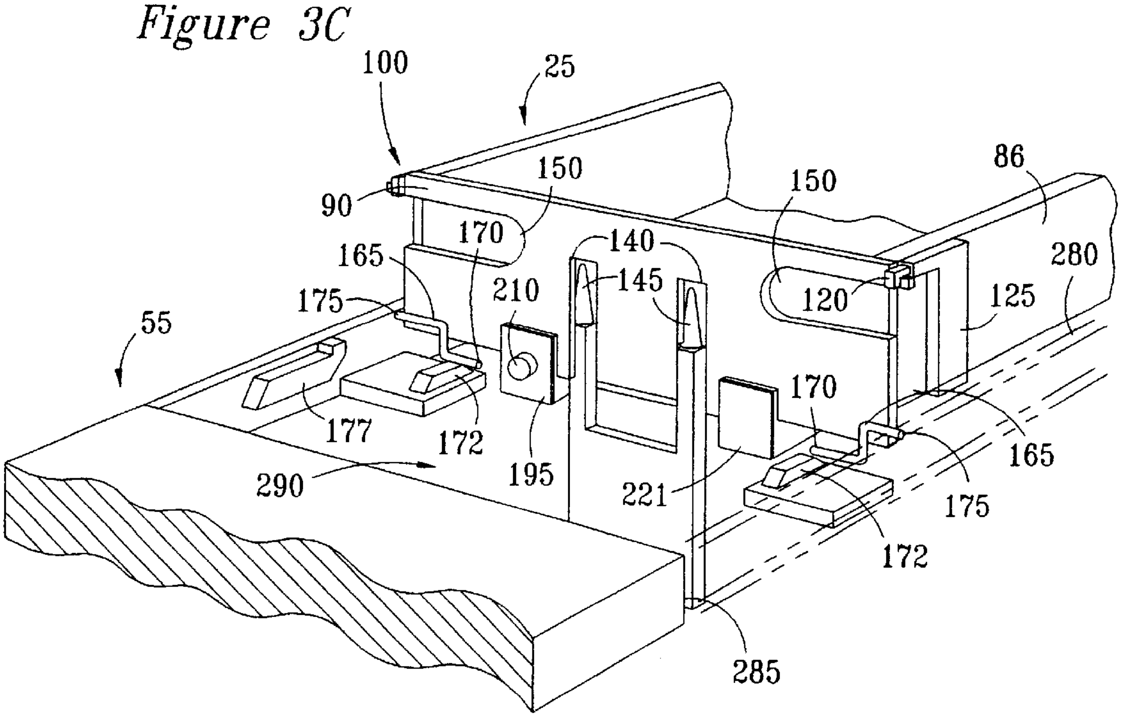
FIG. 3C is a perspective view of the front end of the cartridge of FIG. 3A entering the receiving dock of the autofeeder system of FIG. 2.
Figure 3D:
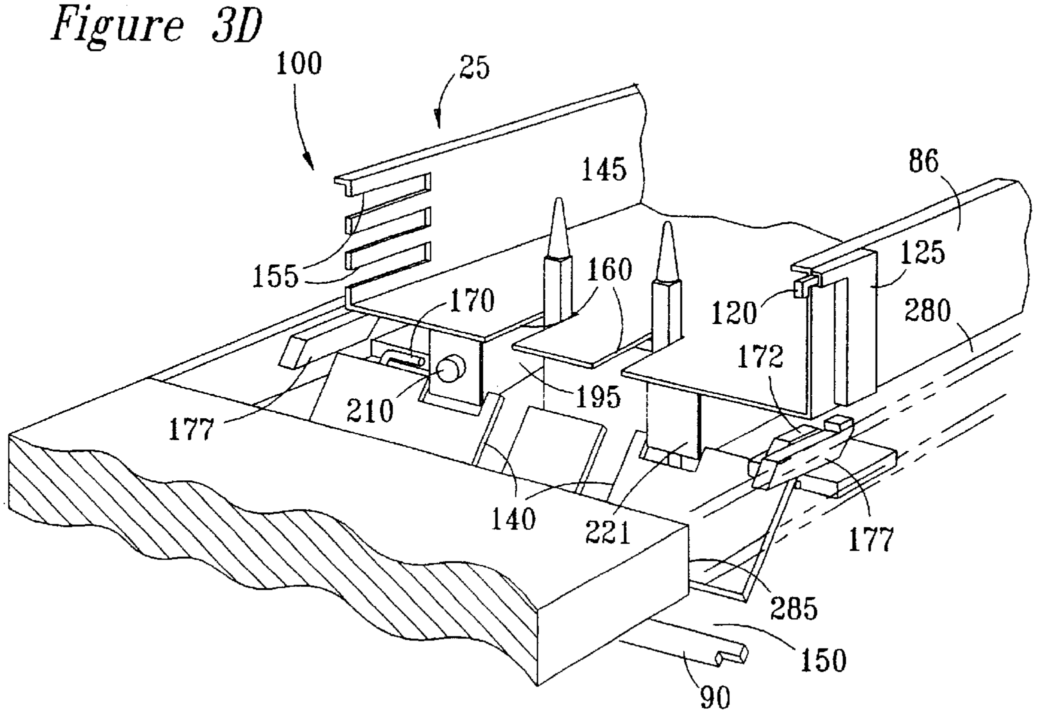
FIG. 3D is a perspective view of the front end of a cartridge of FIG. 3A, during docking in the receiving dock of the autofeeder system of FIG. 3A.
Figure 4A:
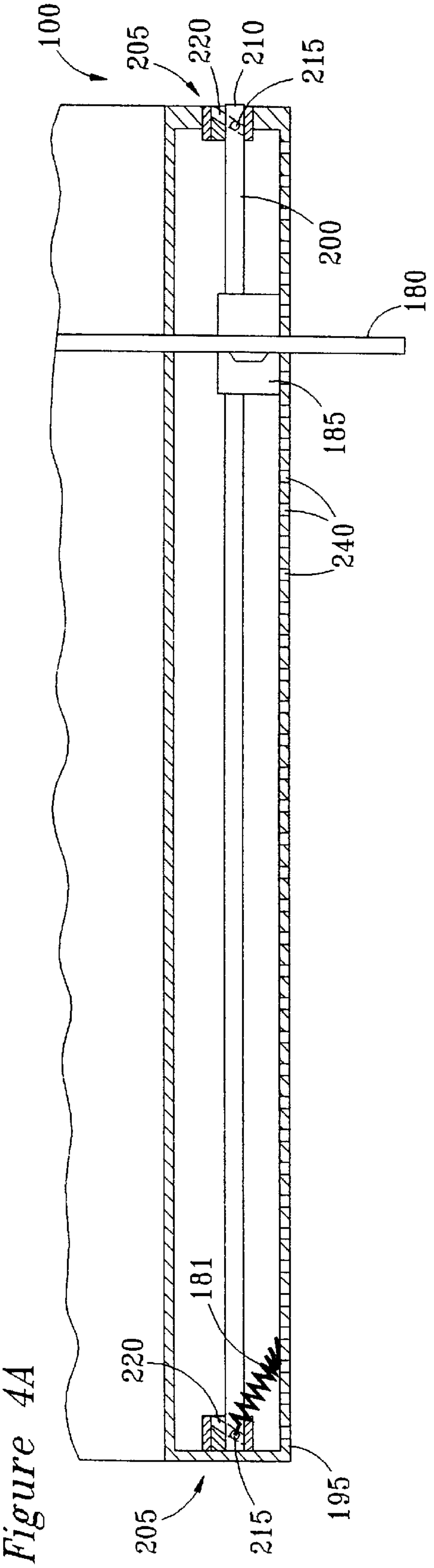
FIG. 4A is a schematic section view, taken on the line 4A—4A of FIG. 3A, illustrating a ratchet carriage assembly for selectively locking a cartridge rear stack support paddle in place, in the locked position.
Figure 4B:
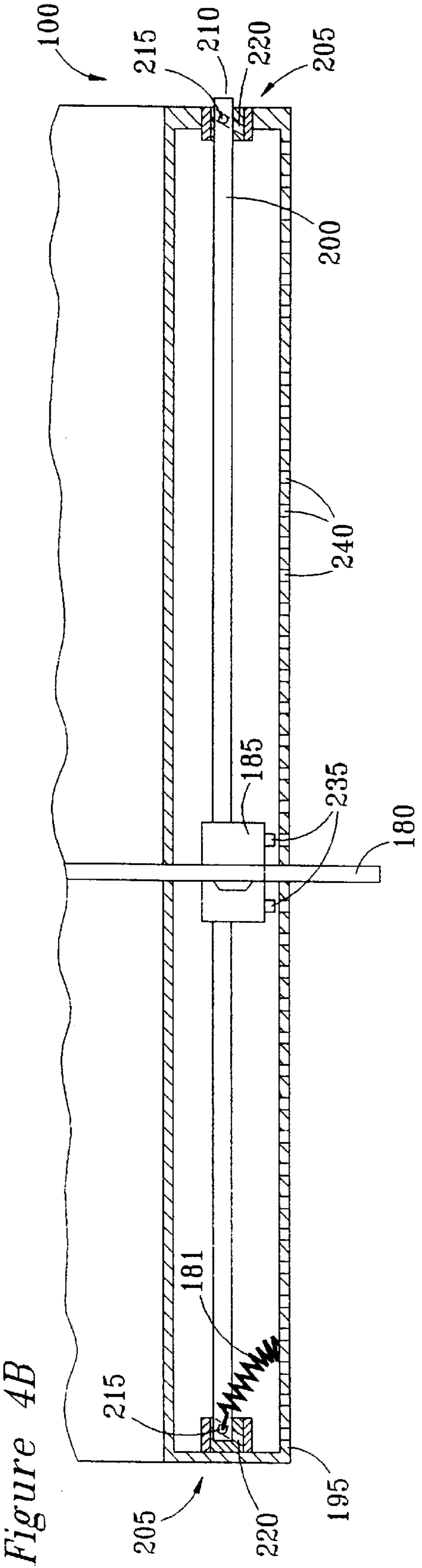
FIG. 4B is a schematic section view, taken on the line 4A—4A of FIG. 3A, illustrating the ratchet carriage assembly for selectively locking the cartridge rear stack support paddle in place, in the unlocked position.

The cartridge door 90 includes two open notches 140, extending from the bottom edge of the door to about its middle. The open notches 140 permit a set of hold bars 145 in docking station 55, as depicted in FIGS. 2 and FIGS. 3C and 3D, to pass through the cartridge door 90 and press against the stack of mail, while permitting the door to open around hold bars 145 (in a manner to be described more fully below). In this way, the front end of the stack of mail (i.e., the end closest the door) can be supported temporarily by the hold bars 145 while the door is opened, so that the front end of the stack in the cartridge is held in place when the door is opened. The hold bars 145 are preferably motorized, and preferably under computer control, so that the hold bars are selectively raised and lowered. Hold bars 145 are also preferably movable in a back and forth direction in the cartridge 25, which may be provided either by a spring (not shown) urging the hold bars in the direction of the cartridge, or by a motor. Although two hold bars 145 are depicted, one or any or other number may also be used.

It should be understood that cartridge door 90 may also be hinged at either the top or side, although a hinge at the bottom is preferred. If a hinge on the top is used, of course, the cartridge must be sufficiently tall to avoid interference with the top of the mail as it is removed. A sliding door may also be employed.

It should also be understood that the function of holding up the front end of the stack 75 of mail during opening (or closing) of the cartridge door 90 can also be accomplished by means other than the set of hold bars 145. For example, in lieu of the hold bars, a set of curved fingers external to the cartridge could be rotated into the cartridge through holes 150, to press on and hold the leading face of the mail stack, and the door opened around the curved finger or fingers. Alternatively, a finger or set of fingers could be extended from the side into the cartridge through slots 155 in the side wall 85 or slots 160 in the bottom of the cartridge. The door 90 is then provided with appropriate channels in the interior face (similar to the open channels 245 in the front face of a rear stack support paddle 180), to receive the fingers without interference with the front of the mail stack. Fingers built into the cartridge, behind the door (either spring-loaded or externally actuated), or in the door itself, may also be employed.

The cartridge door 90 is fitted with an S-shaped cam follower 165 at the lower left and right corners. Although a symmetrical cam follower at each of these corners is preferred, for reducing twisting stresses on the door, one alone may be employed.

Referring to FIGS. 3C, 3D, and 5, to begin the motion of opening the door 90, the lower free end 170 of each cam follower 165 is designed to engage a first wedge or cam 172 in the docking station 55 as the cartridge is inserted into the docking station 55 (or an output compartment 20). The upper free end 175 of the cam follower 165 is designed to engage a second wedge or cam 177 in the docking station 55 as the cartridge 25 is inserted into the docking station 55 (or an output compartment 20), to complete opening the door 90 to approximately 135 degrees or more, so as to clear obstructions in the receiving dock, or the output compartments 20. This is more clearly depicted in FIGS. 3C and 3D.

FIG. 5 depicts, moving right to left, and somewhat overlapping, three stages of opening the door 90 by the cams 172 and 177: (1) closed, beginning opening; (2) fully opened, cartridge partially docked; and (3) fully opened, cartridge fully docked, with the first and second cams operating on the lower and upper ends 170 and 175 of the cam follower 165 as indicated, the different stages being separated by alternatingly dotted lines. Of course, as the cartridge 25 is removed, the process is reversed, closing the cartridge door 90.

The internal, spring-loaded rear stack support paddle 180 is included in the cartridge 25 to hold the stack 75 upright at the back end of the cartridge 25, and to apply a small degree of force to the stack to keep the stack upright. As illustrated in FIGS. 3A, 3B, 4A and 4B, the rear stack support paddle 180 is mounted to a carriage assembly 185 slidably mounted through a slot 190 in the bottom 82 of the cartridge, in an upwardly open channel 195 attached to the underside of the bottom 82. Carriage assembly 185 slides on linear recirculating ball bearings riding on a round shaft 200 longitudinally disposed in the open channel 195 so that the carriage assembly slides smoothly forward and backward in the open channel 195. In lieu of the recirculating ball bearings, telescoping ball bearing slides, such as found on furniture drawers, may be used. In addition, plastic or PTFE bushings, or other expedient means for longitudinal bearings or bushings, can be used.

The round shaft 200 extends through slots 205 at each end of the open channel 195, and is loosely secured by keeper washers (not shown) and longitudinally spring-mounted within the open channel 195 to be urged forwardly by a spring 181. The front end 210 of the round shaft 200 extends through the front of the channel and is engaged by a push rod (not shown) in the docking station 55 or output compartment 20 when the cartridge 25 is docked. This action pushes the shaft 200 longitudinally inwardly against the force of the spring 181. The round shaft 200 is mounted to be movable sideways to a degree in the slots 205, and includes a cam follower 215 adapted to ride on a wedge-shaped cam guide or slot 220 at each end of the open channel 195. A similar sized channel 221 (see FIGS. 3A, 3C and 3D) is included underneath the bottom 82 to maintain symmetry, but does not have an open slot or internal mechanisms.

The rear stack support paddle 180 is urged forwardly by a "constant force" spring 225 having one end attached to and wound onto a spool 230 mounted to the back side of the rear stack support paddle 180, the other end 231 is attached to the bottom of the cartridge 25, near the front end. The spring force is preferably approximately 1.4 pounds on the paddle 180 toward the cartridge door 90.

When the cartridge 25 is removed from either the docking station 55 or an output compartment 20, the internal rear stack support paddle 180 is locked in place by a ratchet mechanism that prevents the paddle from moving away from the cartridge door 90, which might result in the stack of mail to falling or becoming disorganized. To accomplish this, the carriage assembly 185 includes ratchet teeth 235 adapted to be selectively engage a rack or series of holes 240 on one side of the channel 195. When the front end 210 of the round shaft 200 is pushed inwardly by the push rod or by an end wall 285 on the docking station 55 or an end wall of output compartment 20, against the force of the spring 181 at the back end of the round shaft 200, the cam followers 215 on each end of round shaft 200 ride against the wedge-shaped cam surface 220, causing the round shaft to move sideways in the slots 205, until the ratchet teeth 235 on the carriage assembly 185 become disengaged. When the front end 210 of the round shaft 200 is disengaged from the push rod, the force of the spring 181 on the shaft returns the shaft longitudinally, and sideways, to its original position, engaging the ratchet teeth 235 with the rack or series of holes 240 in the channel 195, and locking in place the rear stack support paddle 180.

The rear stack support paddle 180 preferably has forwardly open channels 245 to permit the entrance of fingers from the side into the open channels 245, between the stack of mail and the front face of the paddle, without becoming entangled with the mail. As shown in FIG. 3B, notches 155 in the front of side 85 allow the entrance of fingers from the side when the paddle 180 is at the front end 100.

The rear stack support paddle 180 includes a switch actuating extension 250 on the inboard side (on top of side wall 85) on the upper end of a side support member 251. The switch actuating extension activates external switches (not shown) in the output compartment 20 to signal to the article handling system 10 that the cartridge 25 is either full or partly full of mail and ready for removal, or to indicate the relative degree of filling. The switch actuating extension 250 is also used at the cartridge receiving docking station 55 to signal that the rear stack support paddle 180 has moved forward during the mail removal operation, and to sound an alarm (or take other appropriate action) if such has not occurred. Although the actuating extension 250 preferably actuates a switch mechanically, any suitable sensor (such as photoelectric detector) for determining the location (absolute or relative) of the rear stack support paddle 180 may be employed.

For reasons of economy, the construction of the body of the cartridge 25 is preferably reinforced injection molded plastic. The rear stack support paddle 180, cartridge door 90, door latches 120, carriage assembly 185, and other moving components are preferably steel for reasons of strength and durability, but may be made of other suitable materials, if desired.

Autofeeder

With initial reference to FIGS. 1, 2, 3B, 3C and 5, there is illustrated the autofeed system 50, for receiving cartridges 25 filled with stacked mail and automatically removes the stack from the cartridge, queues the mail, preferably jogs and edges the mail, and feeds the mail to the input feed station of a sorter 15. The autofeeder 50 includes the docking station 55 for receiving a mail-filled cartridge 25, a mail stack unloader 275 operating between the docking station 55, the queuing station 60, and the jogger/edging station 65, leading to the feeding station 70 of sorter 15. These will be described in turn.

1. Docking Station

The docking station 55 includes a receiving shelf 280, a receiving channel 290 in the shelf for receiving the cartridge door 90 without interference, the cartridge door latch unlocking cam 135 and the cartridge door opening lower cam 172 and upper cam 177 (shown in FIGS. 3C, 3D and 5, but not FIG. 1 or 2), which are laterally displaced from one another to line-up when the cartridge 125 is inserted with the lower cam follower 170 and upper cam follower 175. In addition, cartridge alignment guides (not shown) preferably guide channels 195 and 221 on receiving shelf 280 into the dock end wall 285. The two hold bars 145 are provided in the docking station 55, extending upwardly from a common vertical member.

A cartridge 25 with a horizontal stack 75 is placed onto the receiving shelf 280 and moved forwardly to the end wall 285 by automated or manual means. Referring to FIG. 5, beginning with position (1), as the cartridge 25 slides forward, the unlocking cam 135 in the docking station 55 actuates the bottom end 132 of the latch release 130, which in turn lifts latch 120, thereby releasing the latch from the latch bar 115, thus unlocking the cartridge door 90. As the cartridge 25 continues to move forward (to the left, in the figures) on the receiving shelf 280, the lower cam follower 170 strikes the face of cam 172, to cause the door 90 to begin opening. The door continues to open as the cartridge moves forward, until the door is open about 90 degrees from the closed position. At this point, upper free end 175 of the cam follower 165 is low enough to ride under the wedge of the cam 177. As the cartridge continues to move forward to position (2), the wedge of cam 177 continues to open the door 90, until the door is open about 135 degrees from the closed position, that is, a fully open position. The upper free end 175 of the cam follower 165 then continues under the straight part of cam 177 until the front end 100 of the cartridge is abutted against the dock end wall 285, thereby unlocking the rear stack support paddle 180 by operation of the round shaft 200. The mail stack 75 can now be removed from the cartridge 25, by pushing the rear stack support paddle 180 forward, over a feeder bar 295 on the top of the dock end wall 285 (see FIGS. 3C and 3D).

At the same time as the cartridge 25 is being inserted, and just before the door is unlocked and begins to open, hold bars 145 are raised from the docking station 55, as indicated by the arrows by an actuator (not shown), to pass through open notches 140 in the cartridge door 90 as the cartridge moves forward. The hold bars 145 are spring-loaded to exert a force on the front surface of the stack of mail, while permitting the hold bars 145 to move with the cartridge as it moves forward. The hold bars 145 are mounted to move forward at the same speed as the cartridge. As the cartridge door 90 opens the hold bars 145, passing through open notches 140, hold the front pieces of mail in place, keeping the stack from falling as the door is opened. As previously mentioned, just as the cartridge abuts the dock end wall 285, the front end 210 of the round shaft 200 strikes the dock end wall, to unlock the rear stack support paddle 180 in preparation for unloading of the mail stack from the cartridge. The insertion of a cartridge onto the receiving shelf 280, and the opening of the cartridge door 90 around the hold bars 145, are schematically depicted, stepwise in order, in FIGS. 9, 9A and 9B.

Referring to FIG. 2, a stack unloader 275 is used to support and remove the stack of mail from the cartridge 25 after it is docked, and move the stack to the queuing station 60. The unloader 275 includes a rear finger carriage 300 and a front finger carriage 305 mounted on guide rails 310 and 315 running parallel to the length of the autofeeder 50, behind a slotted stack support wall 320. Each of the finger carriages 300 and 305 is independently movable longitudinally along the guide rails 310 and 315 between the docking station 55 and the queuing station 60 by means of drive motors (not shown), preferably under computer control.

Each of the finger carriages 300 and 305 includes a set of fingers, 325 and 330, respectively, that are mounted to be extended and retracted, in and out from the respective carriage 300 or 305, through the slotted stack support wall 320.

The rear finger carriage 300 also includes a rotatable stack pusher 335, preferably generally in the form of a hook, and mounted to be rotatable into, and out of, the open top of the rear end of the cartridge 25, behind rear stack support paddle 180.

With particular reference to FIGS. 9C to 9M, the operation of the unloader 275 will now be described. It is understood that, prior to the position depicted in FIG. 9C, the fingers 325 and 330 of the finger carriages 300 and 305 have been retracted, the stack pusher 335 raised, and both finger carriages 300, 305 moved rearwardly, with rear finger carriage 300 adjacent the rear end of the cartridge 25 and front finger carriage 305 adjacent the front end of the cartridge, such that when the fingers 330 are extended the hold bars 145 (when in the stack holding position) will be between the fingers 330 and the rear stack support paddle 180.

Figure 9C:
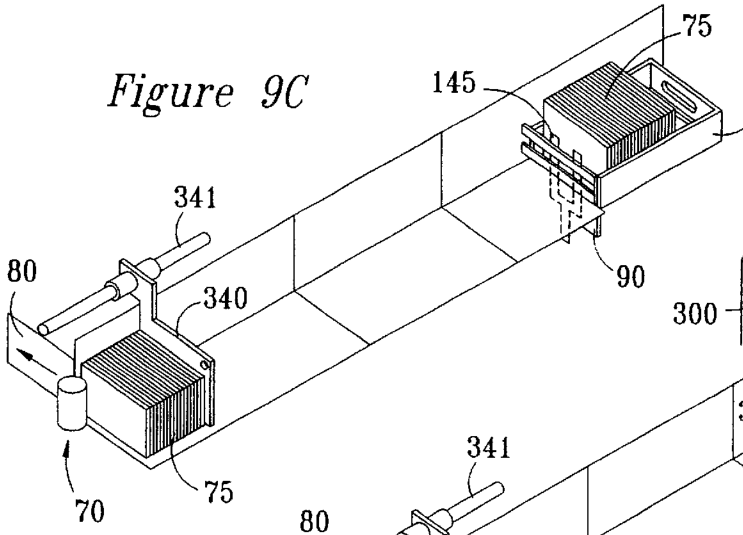
Figure 9D:
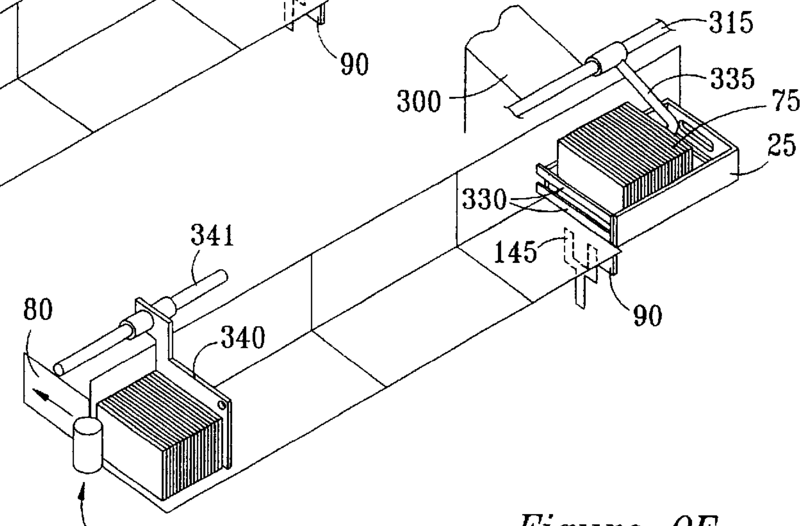

As soon as the cartridge 25 is fully docked, the fingers 330 of the front finger carriage 305 are extended through the slotted stack support wall 320, just in front of hold bars 145, as shown in FIG. 9C. Next, as depicted in FIG. 9D, the hold bars 145 are retracted, out of the way. The front end of the mail stack is now supported by fingers 330. At about the same time, or just after, the pusher 335 is rotated down into the open top of the rear end of the mail cartridge 25, behind the rear stack support paddle 180, and the rear finger carriage 300, with the fingers 325 still retracted, is moved forward until the pusher 335 just contacts the back of rear stack support paddle 180.

Figure 9E:
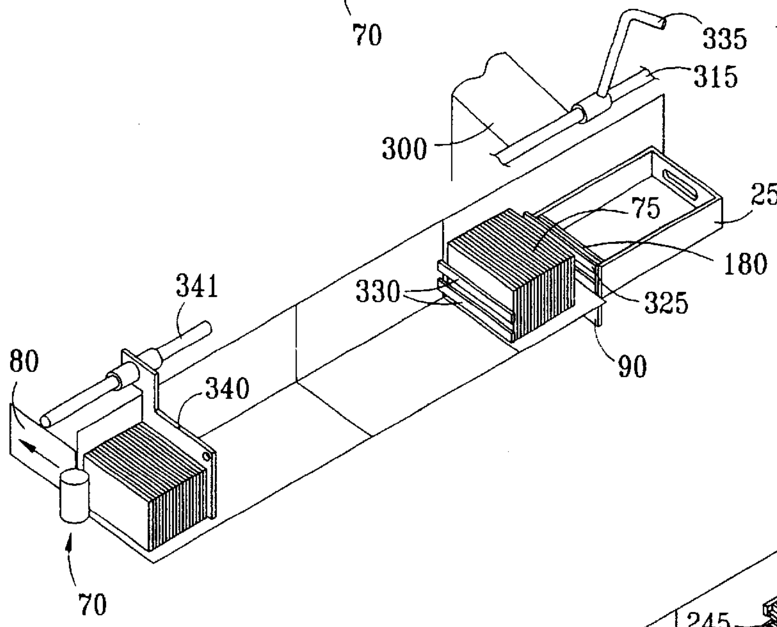
Figure 9F:
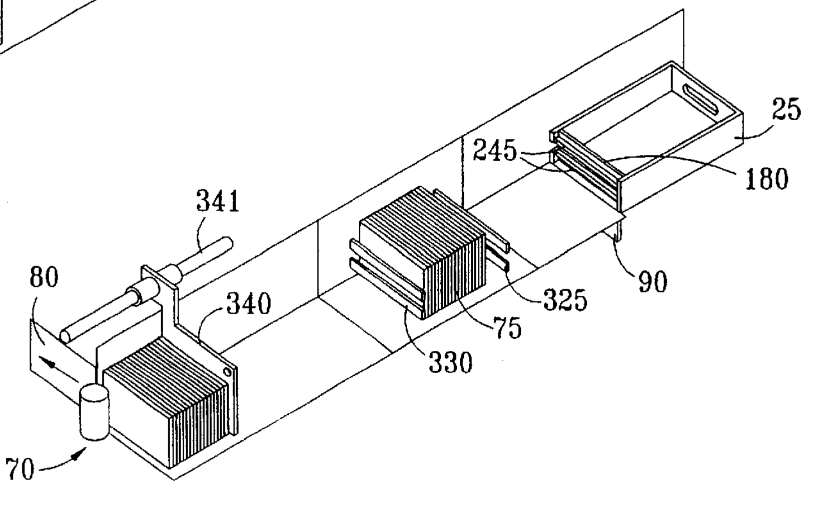

The rear finger carriage 300, with the pusher 335 down, is then driven forward, pushing the rear stack support paddle 180 and the stack of mail, while at the same time the front finger carriage 305 with the fingers 330 extended, is driven forward, with the mail stack 75 retained between the extended fingers and the rear stack support paddle 180, until the rear stack support paddle is all the way to the front of, or just out of, the front end of cartridge 25. Because of the built-in spacing between the pusher 335 and fingers 325, at this point, the fingers 325 (still retracted) are positioned directly adjacent the forwardly open channels 245 of the rear stack support paddle 180. As illustrated in FIG. 9E, the rear finger carriage 300 then extends the fingers 325 into the forwardly open channels 245 of the rear stack support paddle 180, between the support paddle and the rear end of the mail stack 75, without interfering with the mail. The mail stack is now supported between the fingers 325 of the rear finger carriage 300 and fingers 330 of the front finger carriage 305. The pusher 335 is then rotated up out of the cartridge 25.

2. Queuing Station

At this point, both front and rear finger carriages 300 and 305, with the respective fingers extended, are moved in unison longitudinally along the guide rails 310 and 315, sliding the mail stack from the docking station 55 to the queuing station 60, as illustrated in FIGS. 9F–9I, where a previously placed stack of mail 75' is held in place by a queuing station paddle 340. The queuing station paddle 340 is longitudinally movable and rotatable on a guide shaft 341.

Figure 9G:
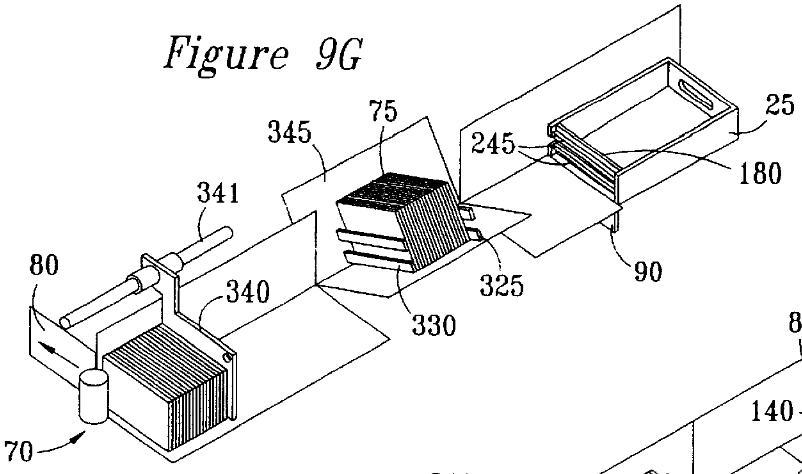
Figure 9H:
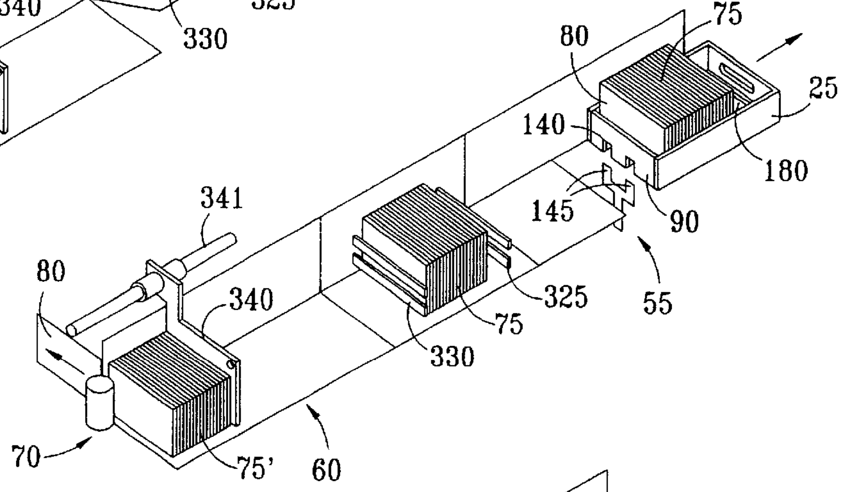

It should be noted that, in FIG. 9G, an optional tilting edging table 345 is depicted as a part of the queuing station 60. The edging table 345 is mounted to tilt and vibrate, to help edge and move the mail to the slotted stack support wall 320. However, this tilting edging table 345 is not required if the article handling system 20 includes the jogging/edge station 65, or other means for ensuring that the mail is feed in an orderly manner to the feeding station 70. The jogging/edging station 65, to be described in more detail below, is preferred.

At this time, the now-empty cartridge 25 is removed from the docking station 55 by manual or automatic means. Of course, as it does so, the cartridge door 90 is closed, latched and the rear stack support paddle 180 locked, in reverse order to the operation that occurred when the cartridge was inserted.

Figure 9I:
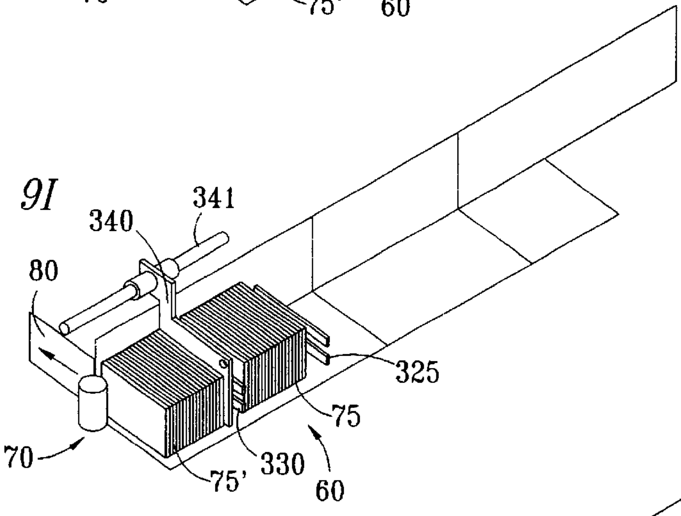
Figure 9J:
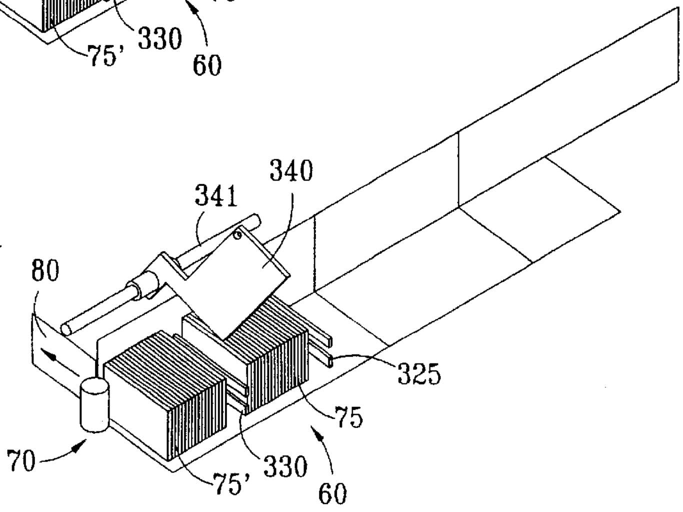
Figure 9K:
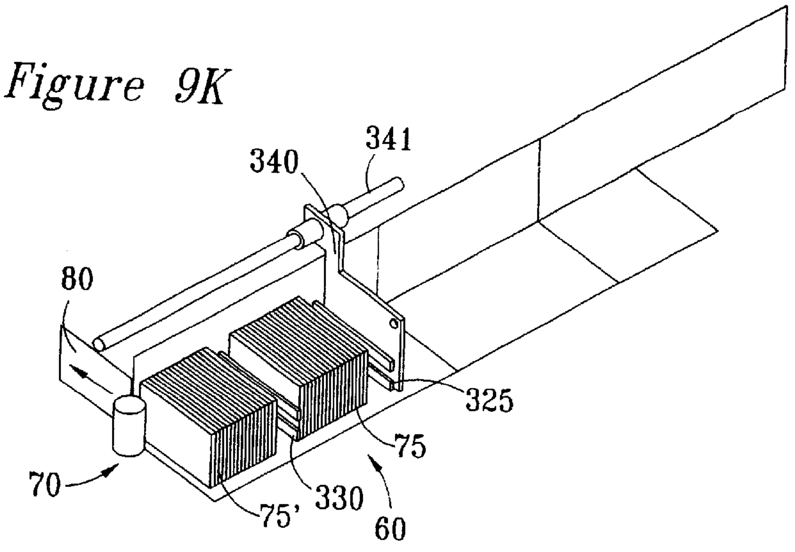
Figure 9L:
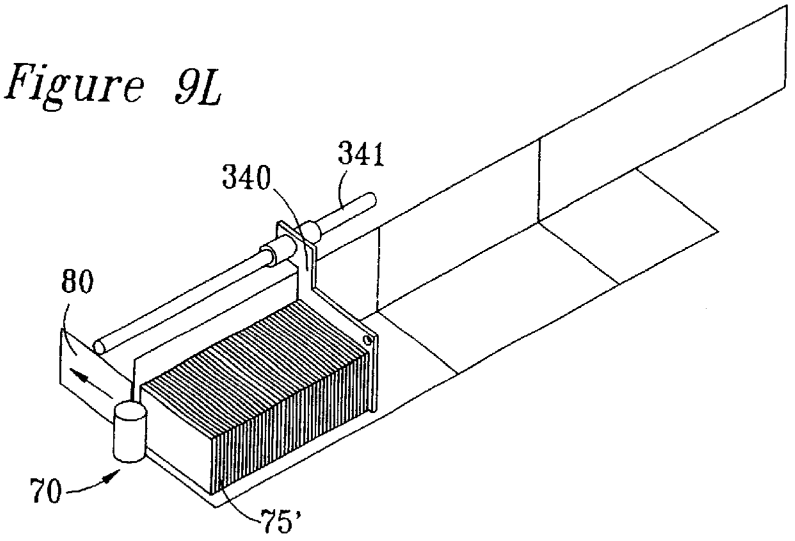
Figure 9M:
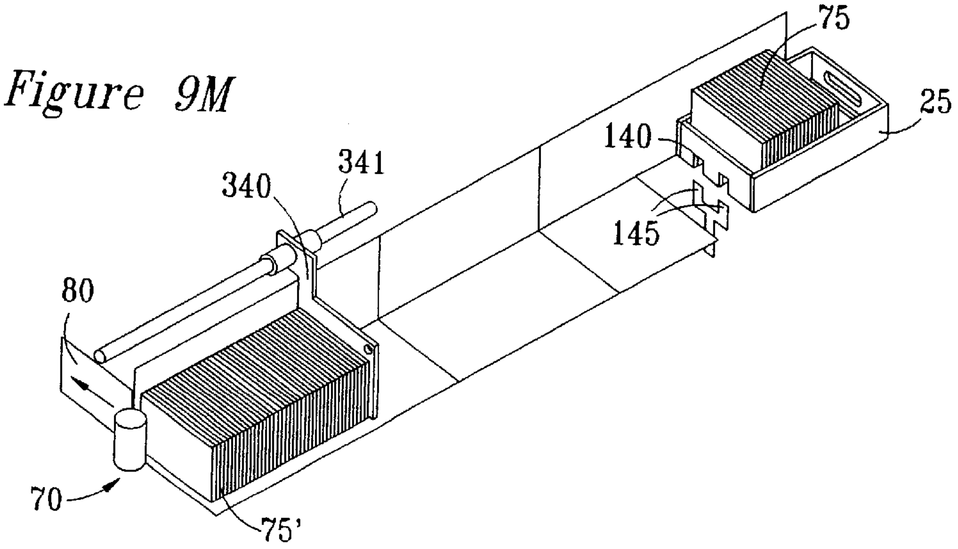
Figures 10A, 10B, 10C, 10D, 10E, 10F:
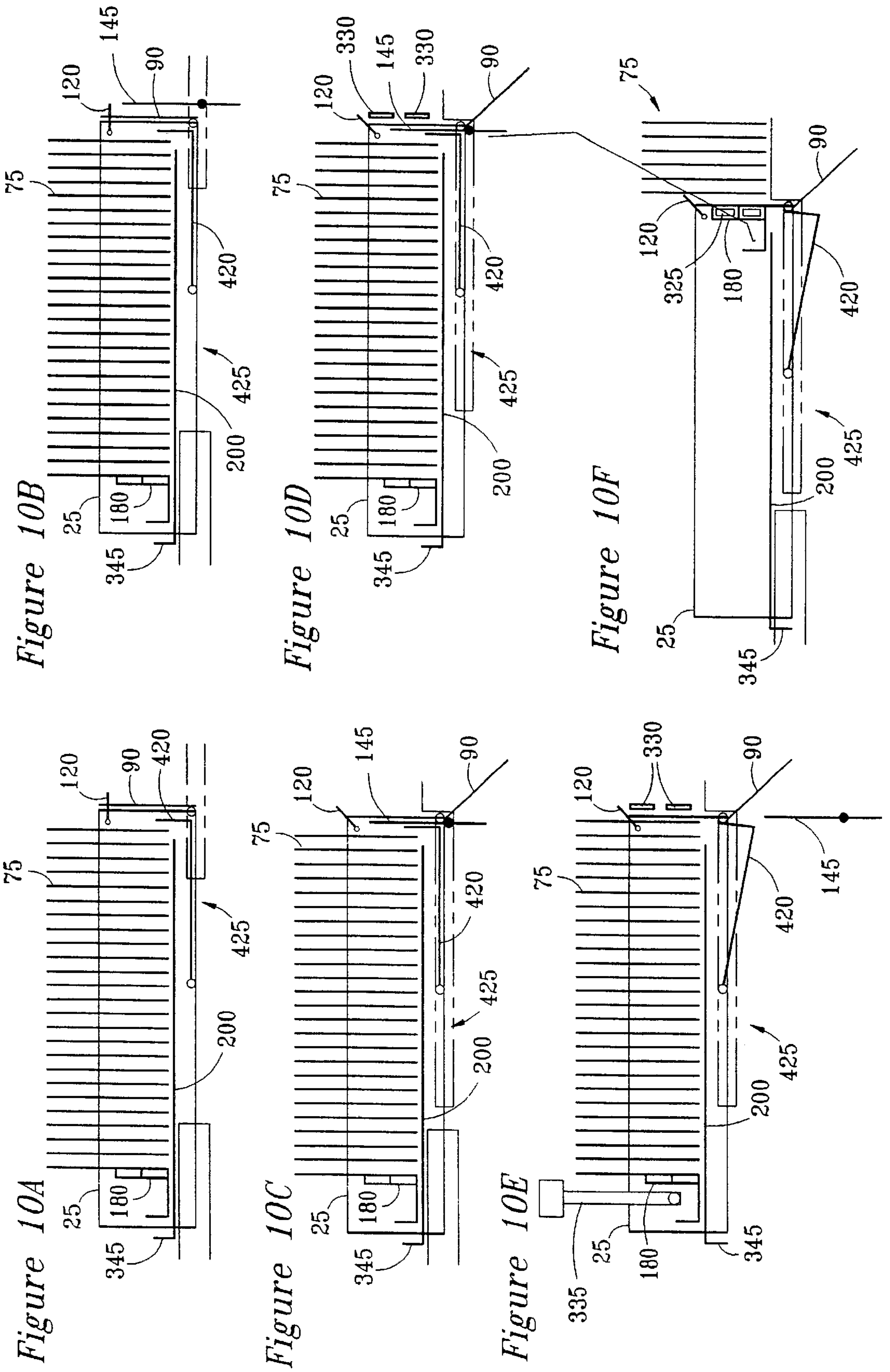
FIGS. 10A–10I are schematic illustrations of a sequence of operations for the docking of a cartridge onto the cartridge receiving dock of the autofeeder system of FIG. 2, the unloading of the cartridge, and the removing of the cartridge from the dock.
Figure 10G:
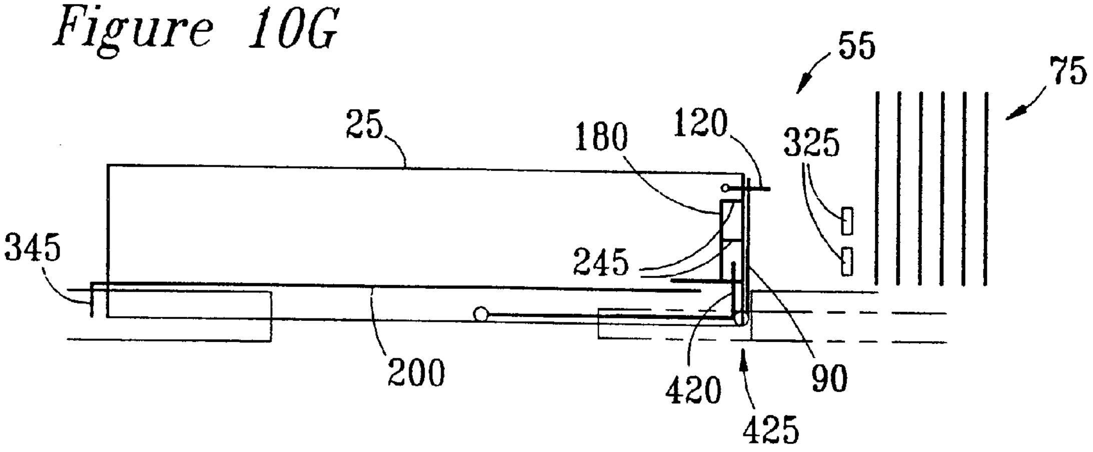
Figure 10H:
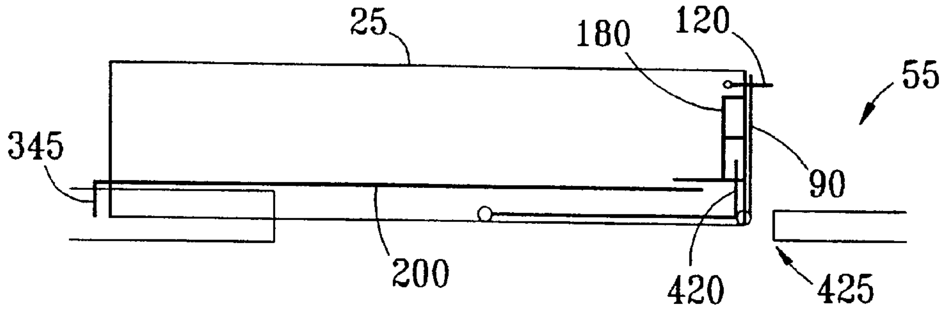
Figure 10I:
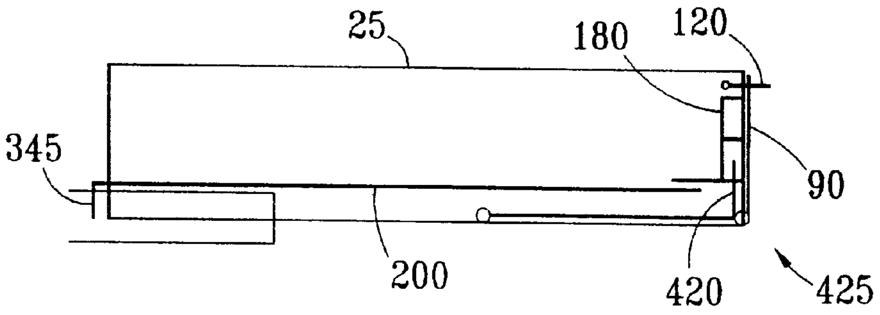

When a mail stack 75 from the cartridge 25 reaches the queuing station 60, the queuing station paddle 340 engages the fingers 330 of the forwarding mail stack 75, as illustrated in FIG. 9I. The fingers 330 maintains pressure on the mail stacks 75 and 75', and the queuing station paddle 340 is rotated from between the two stacks (the previously placed stack 75' and the arriving stack 75), as shown in FIG. 9J. The queuing station paddle 340 is then moved on the guide shaft 341 until positioned just behind the fingers 325 of the rear finger carriage 300 and is then rotated into position behind the fingers 325, as depicted in FIG. 9K. The fingers 330 of the front finger carriage 305 are then retracted into the carriage, leaving the stacks 75' and 75 abutted together, forming a "new" previously placed stack 75', as illustrated in FIG. 9L. The fingers 325 are then retracted into the rear finger carriage 300, leaving the arriving stack 75 (now a part of "new" stack 75') supported by the queuing station paddle 340, the starting point of the process, as depicted in FIG.

9M. At this point, both the front and rear finger carriages 300 and 305 are free to move back to the docking station 55, to prepare to unload another stack of mail from a cartridge 25 and the process repeats.

Referring again to FIG. 2, the stack of mail 75' in the queuing station 60 is moved by the queuing station paddle 340 to the jogger/edging station 65, where the mail is jostled to align the bottom edges of the mail in an orderly fashion, and to urge the inside edge of each piece of mail toward a back wall 345. The construction and operation of the jogger/edging station 65 will now be described below.

3. Feed-Through Jogger/Edger

Figure 16:
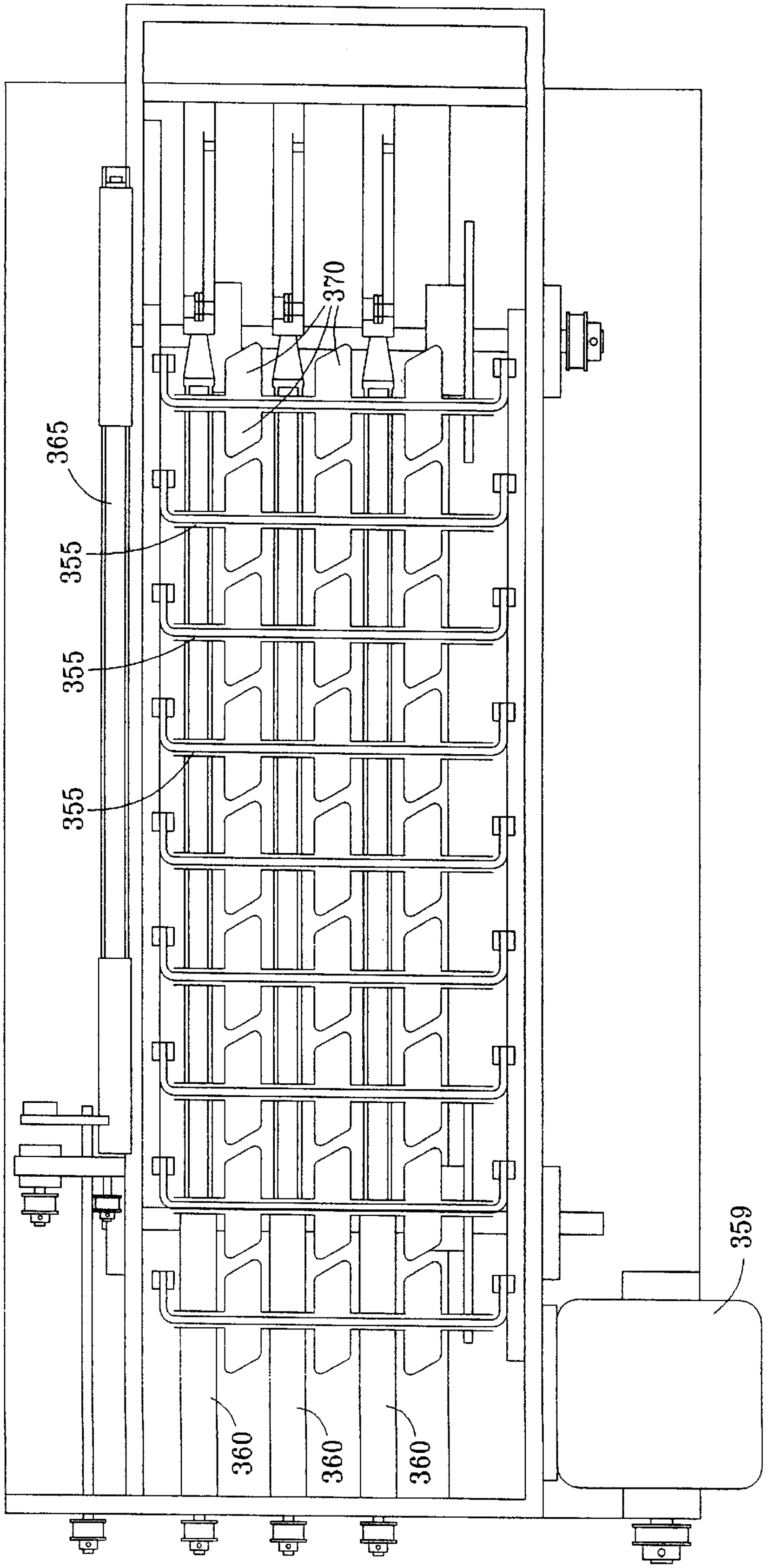
FIG. 16 is a top view of the feed-through jogger of FIG. 15, partly in phantom.
Figure 17:
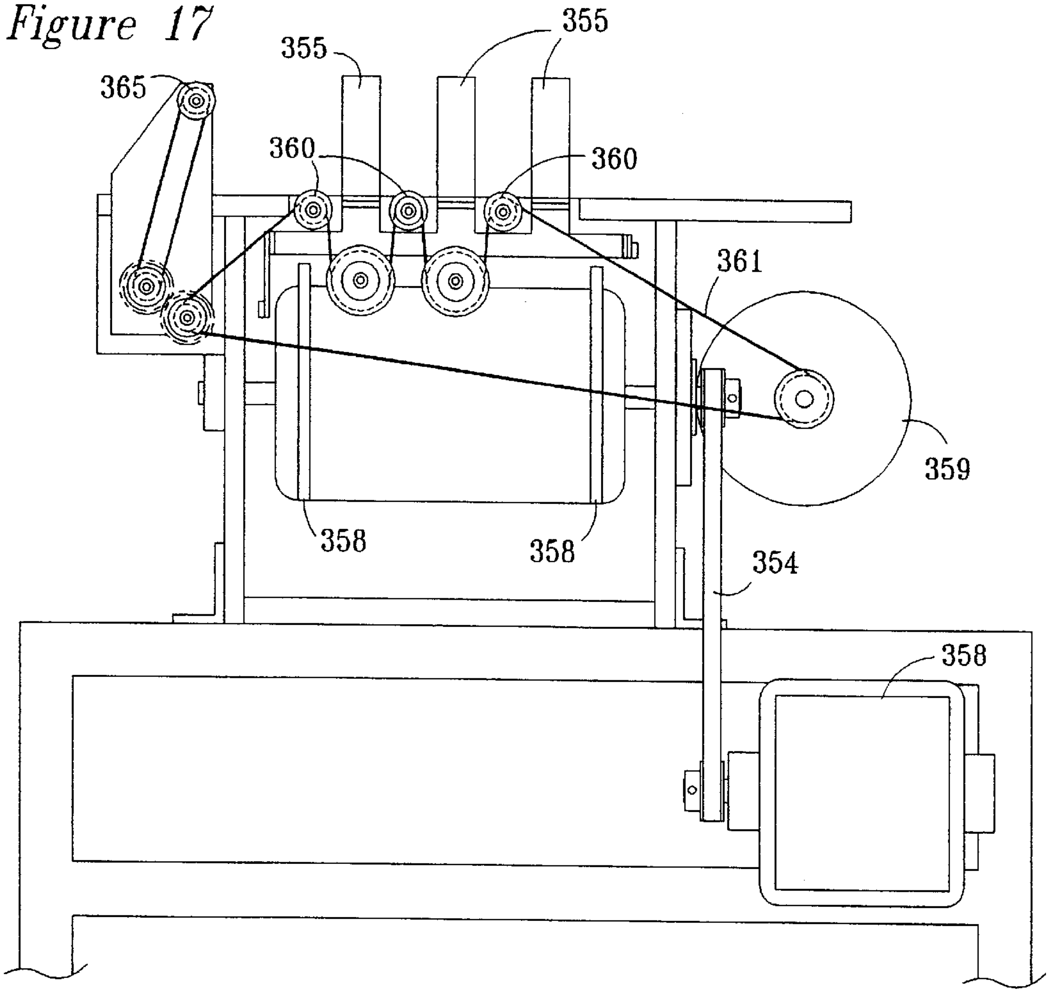
FIG. 17 is an end view of the feed-through jogger of FIG. 15, partly in phantom, showing the drive elements for the rotating lobed shafts.

The jogger/edging station 65 preferably employs a feed-through upstanding tab jogger/edger 350 or an improved rocking tab jogger/edger 350'. With initial reference to FIG. 2 and FIGS. 15–17, jogger/edger 350 has several rows (three, for example, as shown) of vertical tabs 355 mounted at their lower edge to a continuous chain 357 rotatable between two sprockets 358. The continuous chain 357 is driven by a motor 358 (visible in FIG. 16) through a belt drive 354 so that the vertical tabs 355 gradually move counterclockwise, carrying small pockets of mail (approximately 5–10 pieces) in a generally vertical orientation toward the feeding station 70 of the sorter 15.

A lobed shaft 360 extends longitudinally in the feed direction, one lobed shaft 360 in between each row of tabs 355, and one between the inward—most row of tabs 355 and the back wall 345. Lobed shafts 360 are rotated in a clockwise direction, facing in the feed direction by a drive motor 359 through a belt or chain 361 in conjunction with the feeder/edger 350, to impart a bouncing motion to the bottom edges of the mail to tend to singulate the mail pieces, and to gently urge the mail through friction toward the back wall 345. At the back wall 345 there is rotatably mounted a lobed shaft 365 that rotates counterclockwise to urge the back edge of the mail downwardly.

To the extent described above, the foregoing construction of jogger/edger 350 is generally the same as conventional jogger/edgers. A conventional jogger/edger shown in FIGS. 15–17 may be employed in the present invention, although with somewhat reduced edging efficiency over the improved jogger/edger described below.

It has been found, however, that with a conventional jogger/edger, the bundle of mail between tabs 355 tends to lean to one side, causing the weight of one mail piece to rest on an adjacent mail piece. Thus, heavy pieces tend to pinch the lighter pieces thereby preventing edging of the lighter pieces and tending to force the individual pieces together, restricting the ability of each mail piece to move independently.

Figure 18:
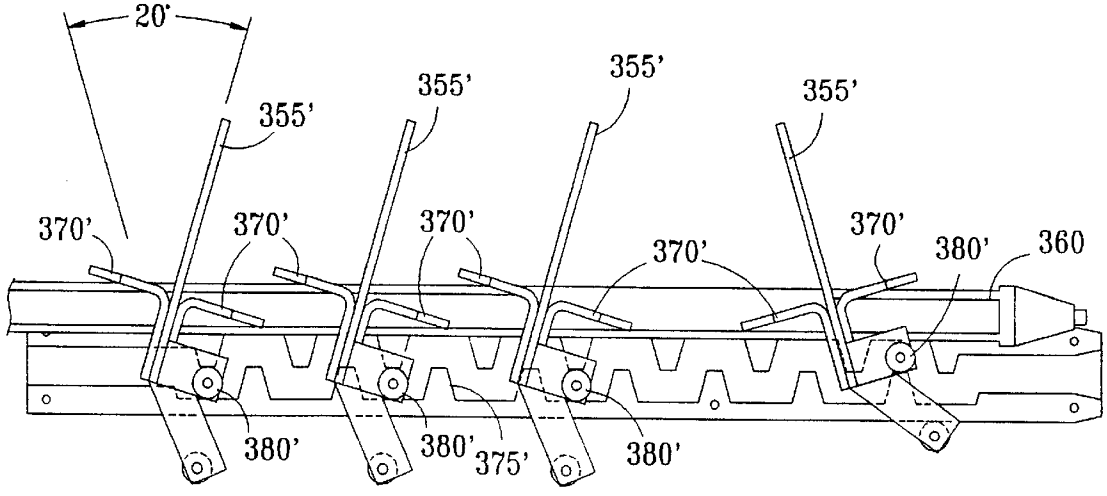
FIG. 18 is a side view, partly in phantom, of a section of an improved feed-through jogger in accordance with an embodiment of the present invention, showing the cam track and cam followers for causing back and forth rocking.

In accordance with the present invention, improved jostling and edging of the mail is achieved if the tabs are made to vacillate (rock) back and forth longitudinally, across a vertical axis, as the mail bundles are moved forward. Referring to FIG. 18, the vacillation is accomplished as follows. In the improved jogger/edger 350', the tabs 355' are provided with ledges 370' on the lower end and on either side of the upward tab 355', like an inverted "T". Mounted below the tabs 355' is a wavy cam guide 375. As the tabs 355' are moved in the same manner as described for the conventional, non-rocking tab jogger/edger 350, a roller cam follower 380', mounted to each of the tabs 355' engages the guide 375', between the wavy cam lobes, thereby causing the tabs 355 to rock back and forth, preferably in the range of 20 degrees each way. This motion causes the individual mail pieces to break free from each other and move independently to an edged position. This minimizes the problem of heavy pieces pinching the lighter pieces to obstruct individual edging. It is preferred that the bundle of mail be jostled such that it moves back and forth across a substantially vertical orientation. When the pieces are vertical, the heavy pieces tend not to restrict the lighter pieces. This allows each mail piece to move independently without the weight of adjacent pieces restricting movement, thus improving the jogging/edging efficiency.

As the tabs 355' move forwardly, the jogged and edged mail is gradually moved forwardly, until it reaches the feeding station 70 of the sorter 15.

Feeding Station

Referring to FIGS. 1 and 2, the feeding station 70 is conventional, and consists of a guide roller 71 for frictionably driving pieces of mail 80 into the sorter 15, one at a time, for sorting. The sorting machine sorts mail pieces into one of an array 19 of output compartments 20 by reading bar codes on the mail pieces, in accordance with the sorting sequence programmed into the sorter at the time the sort is initiated. Since the sorter itself is conventional, it need not be further described.

Autostacker at Sorter Output

With reference to FIGS. 12A–12D and 13, the automatic stacking of mail into cartridge 25 in an output compartment 20 of the sorter 15, and the insertion into and removal of the cartridge 25 from the output compartment 20, will now be described.

The sorter 15 distributes the mail into one of output compartments 20, arranged in rows and columns. Each of the output compartments 20 includes a feed belt 390 encircling a roller 395, a sweep gate 400, and a cartridge receiving dock (not shown) for receiving and holding a cartridge 25 during loading of the cartridge. The cartridge receiving dock includes a wedge for unlatching the cartridge door 90, a dock end wall or lug for actuating the front end 210 of the round shaft 200 to unlock the rear stack support paddle 180, upper and lower cams for opening the cartridge door 90, and a switch or other sensing device to be actuated by the switch actuating extension 250 on the rear stack support paddle 180. Since these devices are arranged and operate in generally same manner as the respective devices in the cartridge docking station 55, already described, these items need not be further described in detail.

The cartridge 25 fits into the output compartment 20 in a manner similar to the cartridge docking station 55. That is, as the cartridge 25 is inserted into the compartment 20, the door locking latch 120 is released, the carriage assembly 185 is released, and the cartridge door 90 is opened. The compartment 20 also includes a switch or other sensor (not shown), actuated by the rear stack support paddle 180 in the cartridge, to notify the sorter 15 when the cartridge is nearly full (approximately 80%), full, empty and/or the relative degree of fullness of the cartridge. The cartridge 25 also preferably actuates a switch (not shown) in the compartment 20 to notify the sorter 15 or supervisory computer that the cartridge 25 is properly placed.

When in an output compartment 20, the cartridge 25 accepts and stacks mail directly from the sorter 15 during a sort. The pieces of mail 80 are fed into the cartridge by the drive belt 390 and, guided by the sweep gate 400.

Referring to FIGS. 12A–12D, the sweep gate 400 preferably consists of an upper smooth guide bar 405 and a lower guide bar 410 having bends or notches 415, open to the cartridge 25, for receiving upstanding fingers 420 of an end effector 425 of a robot cartridge handler (not shown in FIGS. 12A–12D).

Figure 12A:
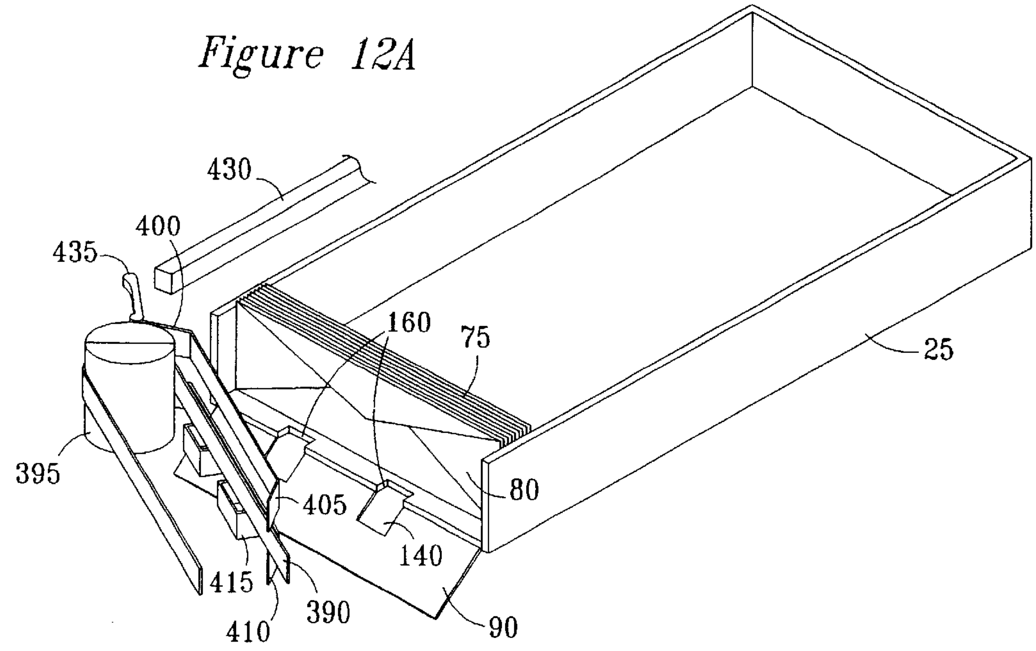
FIGS. 12A–12D show a perspective of the sequence of operations for automatically stacking flat articles into a cartridge in an output compartment of a sorter of the mail sorting machine of FIG. 1, depicting stacking, moving the stack into the cartridge movement and insertion of hold bars to the front end of the stack, and removal of the cartridge from the output compartment.

During stacking of mail into the cartridge 25, the sweep gate 400 is positioned as shown in FIG. 12A, with bars 410 and 405 straddling the drive belt 390 so that mail pieces driven toward the cartridge 25 by the drive belt 390 are guided into cartridge in an orderly stack 75. The spring loaded stack support paddle 180 (see FIGS. 3A and 3B) supplies a gentle urging force against the rear of the stack to assist in orderly stacking of the mail pieces.

When the cartridge 25 is nearly full (approximately 80%), the stack support paddle 180 in the cartridge actuates a switch (not shown) in the output compartment 20, notifying the sorter 15 or supervisory computer that the cartridge is nearly full and should be replaced with an empty cartridge.

In the present invention, sorting operations can continue unabated during changing of cartridges. To do so, when the sorter 15 or supervisory computer receives notification by means of the switch or sensor that the cartridge 25 in an output compartment 20 is nearly full, the sorter 15 automatically redesignates another output compartment having a still-empty cartridge as the receiving location for that category of mail. The redesignation is completed somewhat prior to the time the cartridge 25 is completely full, because the sorter 15 includes a number of pieces of mail at any given time which have not yet been routed to an output compartment 20.

Figure 12B:
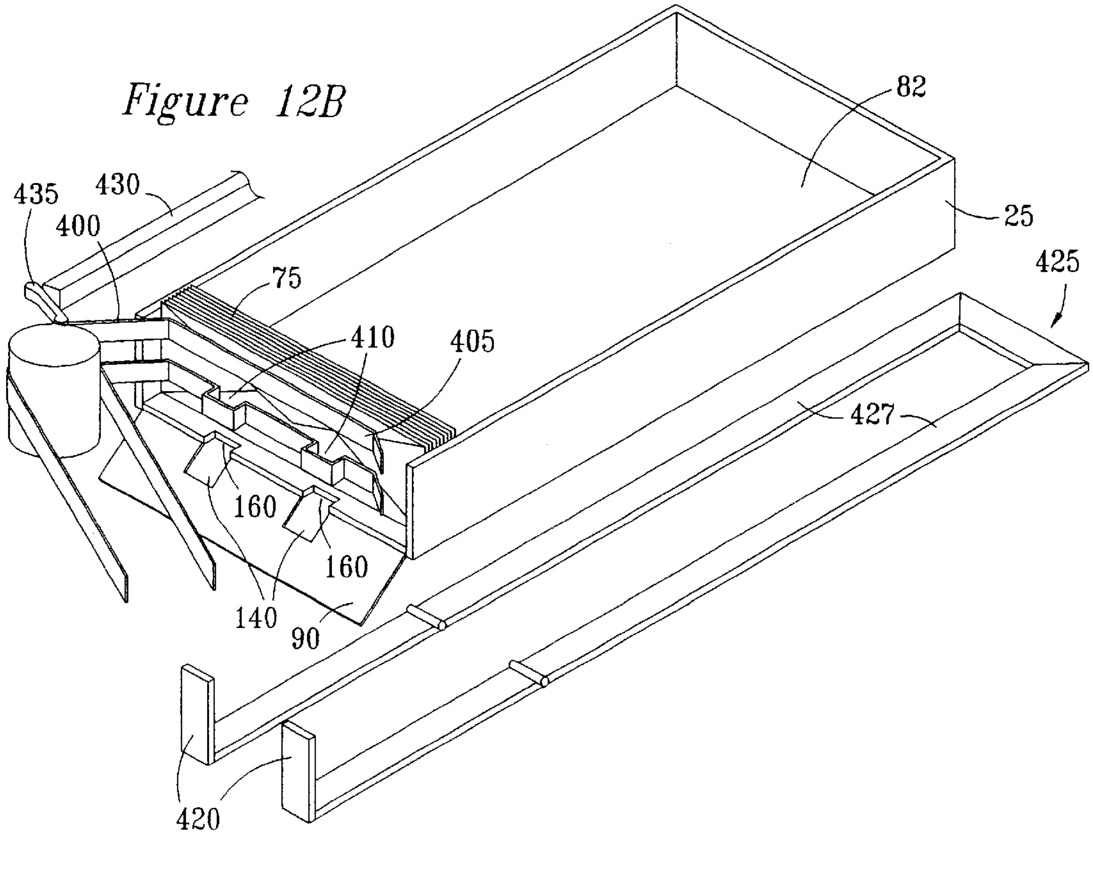
Figure 12C:
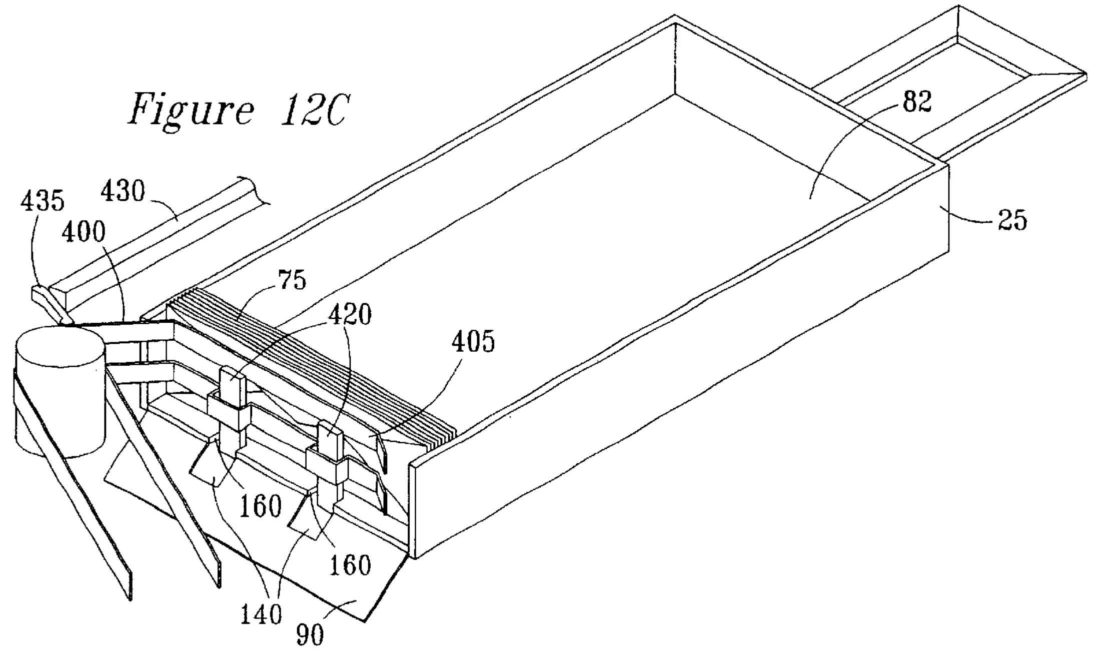
Figure 12D:
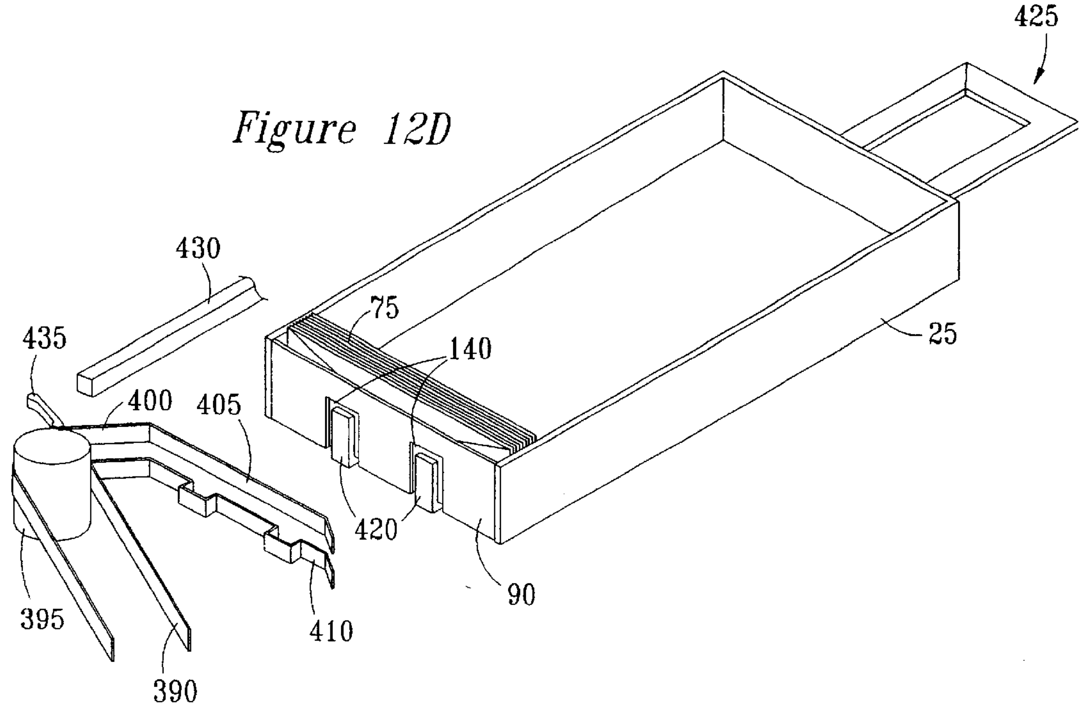

After all mail in process in the sorter 15 available for routing to the output compartment 20 has been run through the sorter so that no more mail is available to be routed to the full or nearly-full cartridge 25, the cartridge removal operation can begin. This process is depicted in FIGS. 12B–12D. First, as shown in FIG. 12B, a robot end-actuator 430 (schematically illustrated in the figures as a bar) moves forward and activates a lever 435 attached to the sweep gate 400 that causes the sweep gate to pivot towards the stack of mail in the cartridge, to fully shove the end of the mail stack into the cartridge. Meanwhile, the end-effector 425 of the robot with support members 427 and upstanding fingers 420 is moved under the cartridge 25. As illustrated in FIG. 12C, the end-effector 425 and upstanding fingers 420 are raised sufficiently to insert the upstanding fingers into the cartridge through the bottom notches 160 provided in the bottom 82 of the cartridge, and up through notches 415 in the lower guide bar 410 of sweep gate 400. The upstanding fingers 420 serve the purpose of retaining the end of the mail stack 75 during cartridge extraction while the cartridge door 90 closes, as well as assisting in securely holding the cartridge for the removal operation. The cartridge may then be pulled out of the compartment via the end-effector 425, as illustrated in FIG. 12D. The end-actuator 430 is also retracted at this time, and the sweep gate 400 returns to a starting, open position, preferably by a return spring on the sweep gate.

As noted above, upon insertion or extraction of the cartridge 25 from the output compartment 20, the cartridge door 90 automatically opens and closes, by means of the cam follower 165 on the bottom of the door, the stack support paddle 180 is released and engaged, respectively, in the substantially the same way as described above with respect to insertion and removal of the cartridge 25 into and from the docking station 55 of the autofeeder 50.

Figure 13A:
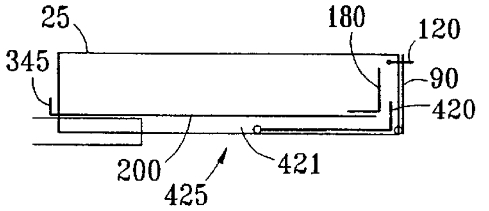
FIG.13A–13I are schematic depictions of a sequence of operations for the docking of an empty cartridge into an output compartment of the sorter of the mail sorting machine of FIG. 1, the stacking of flat articles into the cartridge, and removing of a filled cartridge from the output compartment.
Figure 13B:
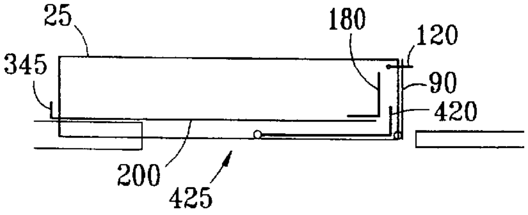
Figure 13C:
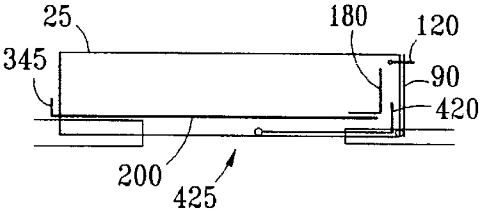
Figure 13D:
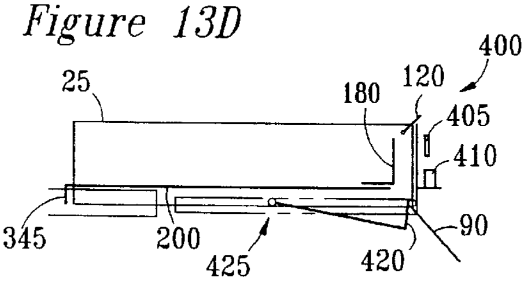

The steps of insertion of an empty cartridge 25 into the output compartment 20 are schematic illustrated in FIGS. 13A–13D. FIG. 13A depicts an empty cartridge being moved into the output compartment 20 by means of support members 427, with the upstanding fingers 420 up, latch 120 engaged, and rear stack support paddle 180 locked in position by means of the round shaft 200. FIGS. 13B and 13C show the cartridge 20 moving toward the receiving dock of the output compartment 20. FIG. 13D depicts the cartridge 20 just after docking, with the latch 120 disengaged, the rear stack support, paddle 180 unlocked, and cartridge door 90 open. The cartridge is now ready to receive mail, guided by open sweep gate 400.

Figure 13E:
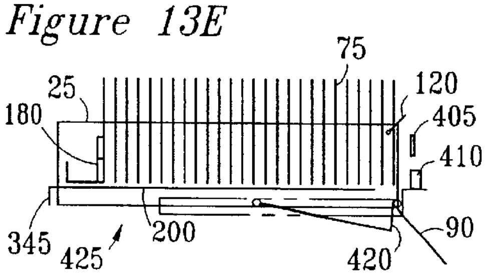
Figure 13F:
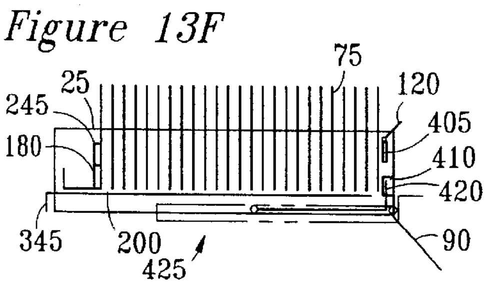
Figure 13G:
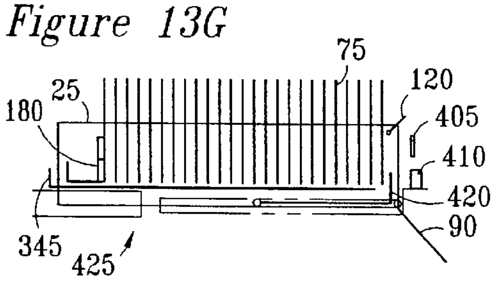
Figure 13H:
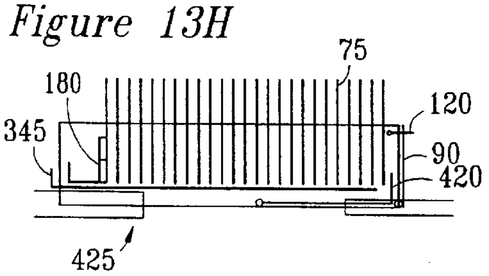
Figure 13I:
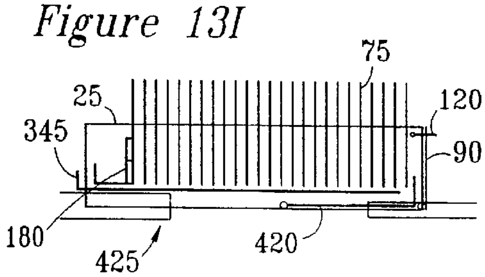

Turning now to FIGS. 13E–13I, the process of removal of a cartridge filled with flat articles from output compartment 20 is illustrated. In FIG. 13E, the cartridge is shown with the cartridge door 90 open, the sweep gate 400 open, the end-effector 425 has entered the compartment underneath the cartridge, but the upstanding fingers 420 have not been raised. FIG. 13F depicts the step in the process after the sweep gate 400 has been rotated to push the stack of mail into the cartridge 25 after the upstanding fingers 420 have been raised. FIG. 13G shows the cartridge 25 just as it has moved away from the dock of the output compartment 20 enough to lock the rear stack support paddle 180 by movement of the round shaft 200. FIG. 13H depicts the cartridge 25 after having been moved away from the dock of the output compartment 20 far enough to close the cartridge door 90, and to engage the latch 120. FIG. 13I depicts the cartridge after being entirely removed from output compartment 20.

Cartridge Transfer and Handling Robot

The cartridge transfer and handling robot 30, which preferably is employed to move the cartridge 25 between the docking station 55, the output compartment 20, and/or a compartment 45 of the buffer shelf 40 will now be described, with reference primarily to FIGS. 6–8.

Figure 6:
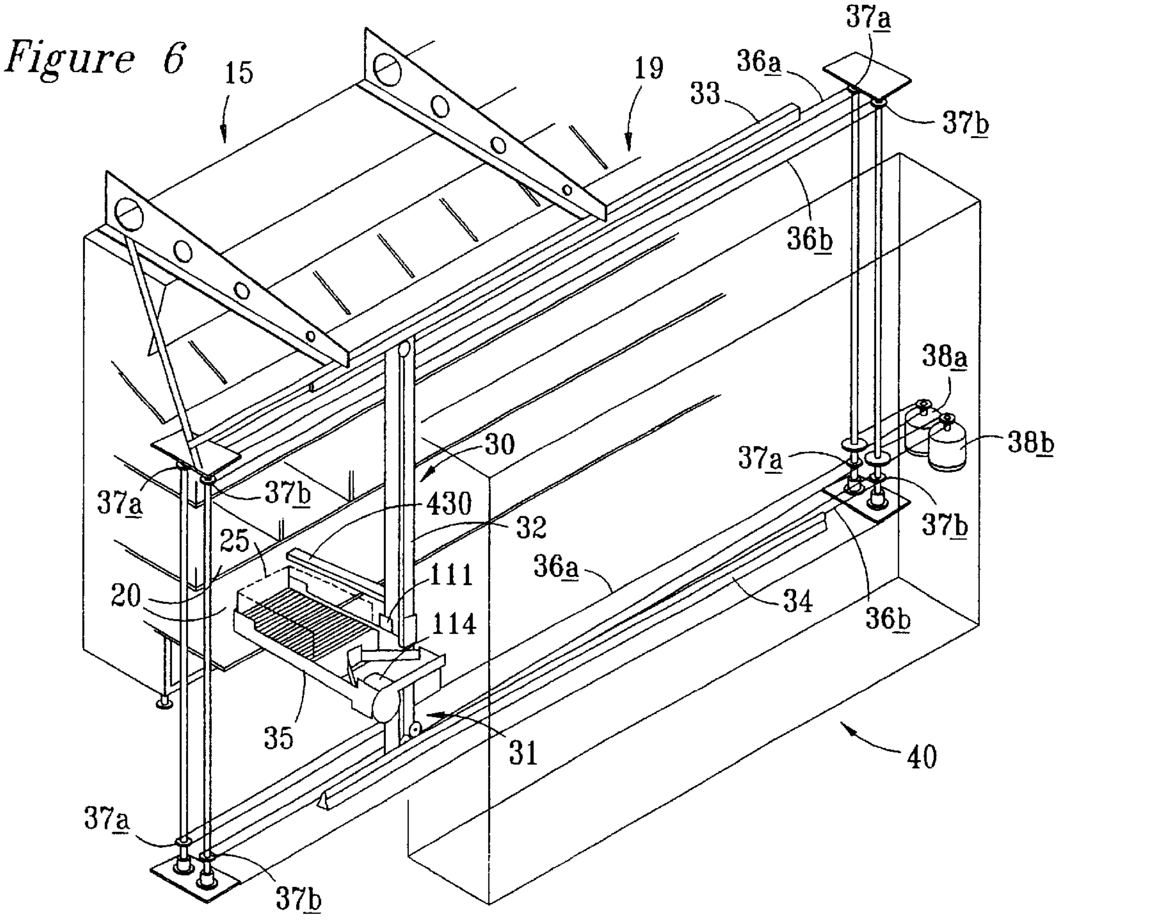
FIG. 6 is a perspective view, partly in phantom, of an X—Y robotic cartridge handling and transfer apparatus in accordance with the present invention.
Figure 7:
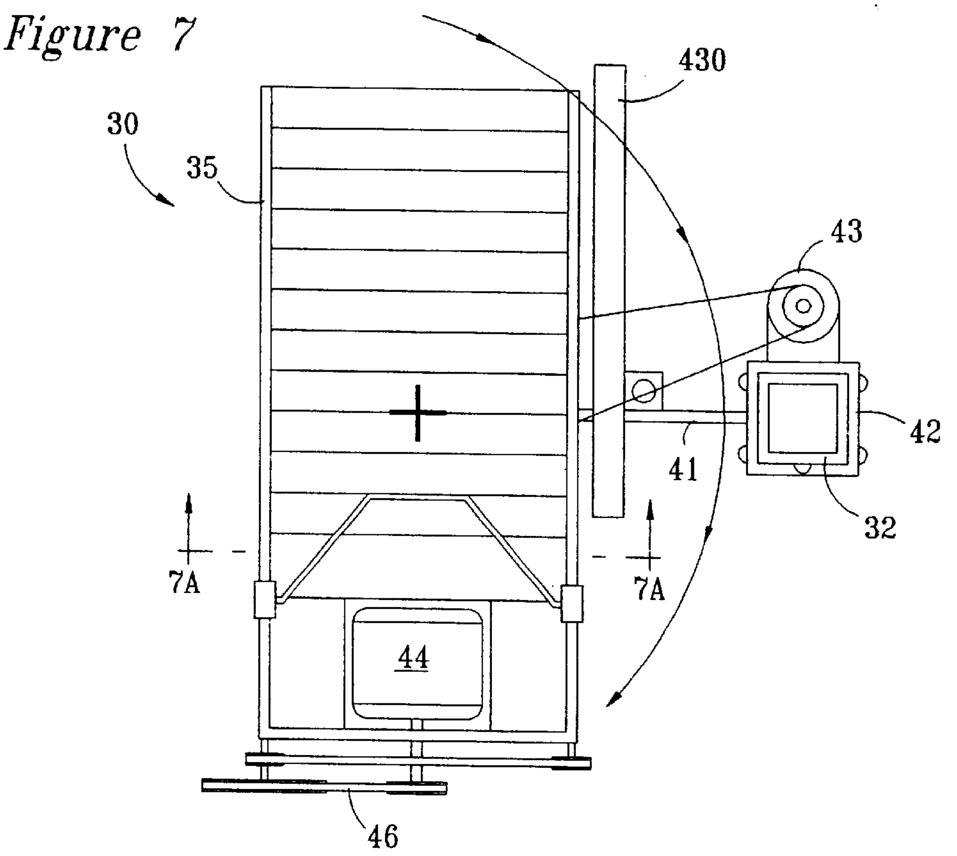
FIG. 7 is a top view of the cartridge support platform of the robotic cartridge handling and transfer apparatus of FIG. 6.
Figure 7A:
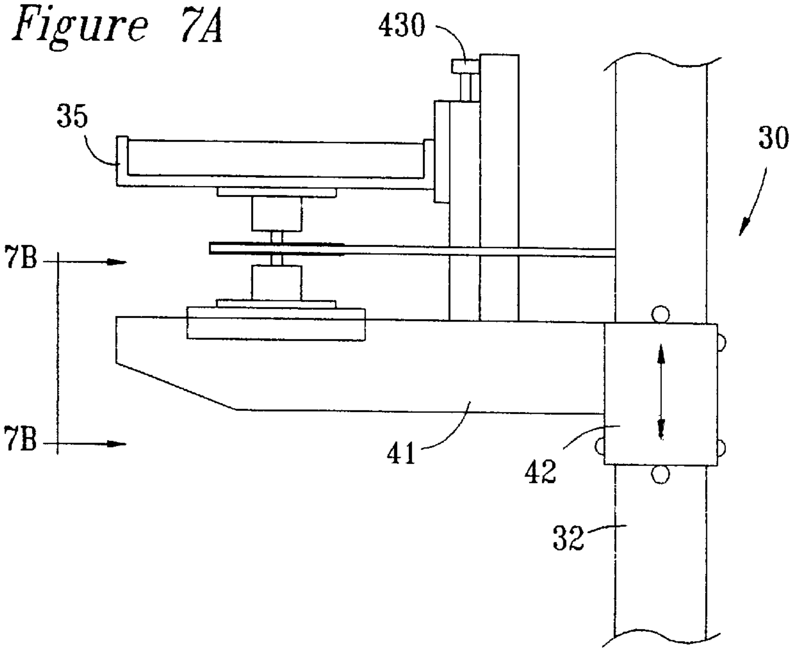
FIG. 7A is a side view taken along the line A—A of FIG. 7 of the cartridge support platform of FIG. 7.
Figure 7B:
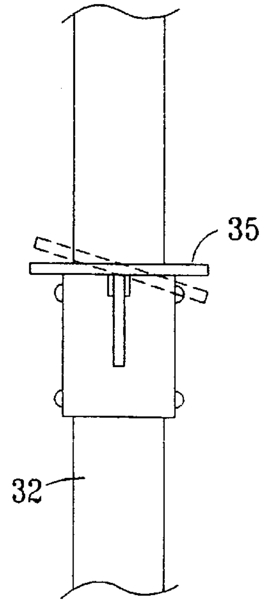
FIG. 7B is a side view taken along the line B—B of FIG. 7A of the cartridge support platform of FIG. 7.

With reference first to FIGS. 6 and 7, the cartridge transfer and handling robot 30 includes a carriage assembly 31 mounted to move on a vertical support column 32 that in turn is mounted for linear movement on an upper rail 33 and a lower rail 34 extending the length of the array 19 of the sorter 15. The carriage assembly further includes the cartridge support platform 35 also mounted to the support column 32 for up-down movement. The support column 32 is driven back and forth along the rails 33, 34 by cables 36*a* and 36*b* mounted to pulleys 37*a* and 37*b*, driven by X—Y drive servo motors 38*a* and 38*b* under computer control.

The cartridge support platform 35 is pivotally mounted to the end of a cantilever support beam 41, attached to the support column 32 by a rack-mounted collar 42, and positioned under computer control by a servo motor 43. The up-down motion of the cartridge support platform 35 is effected by the of servo motor 38*b* driving cable 36*b*, and hence driving a pinion (not shown) against a rack (not show) on the column 32.

Figures 8, 9, 9A, 9B:
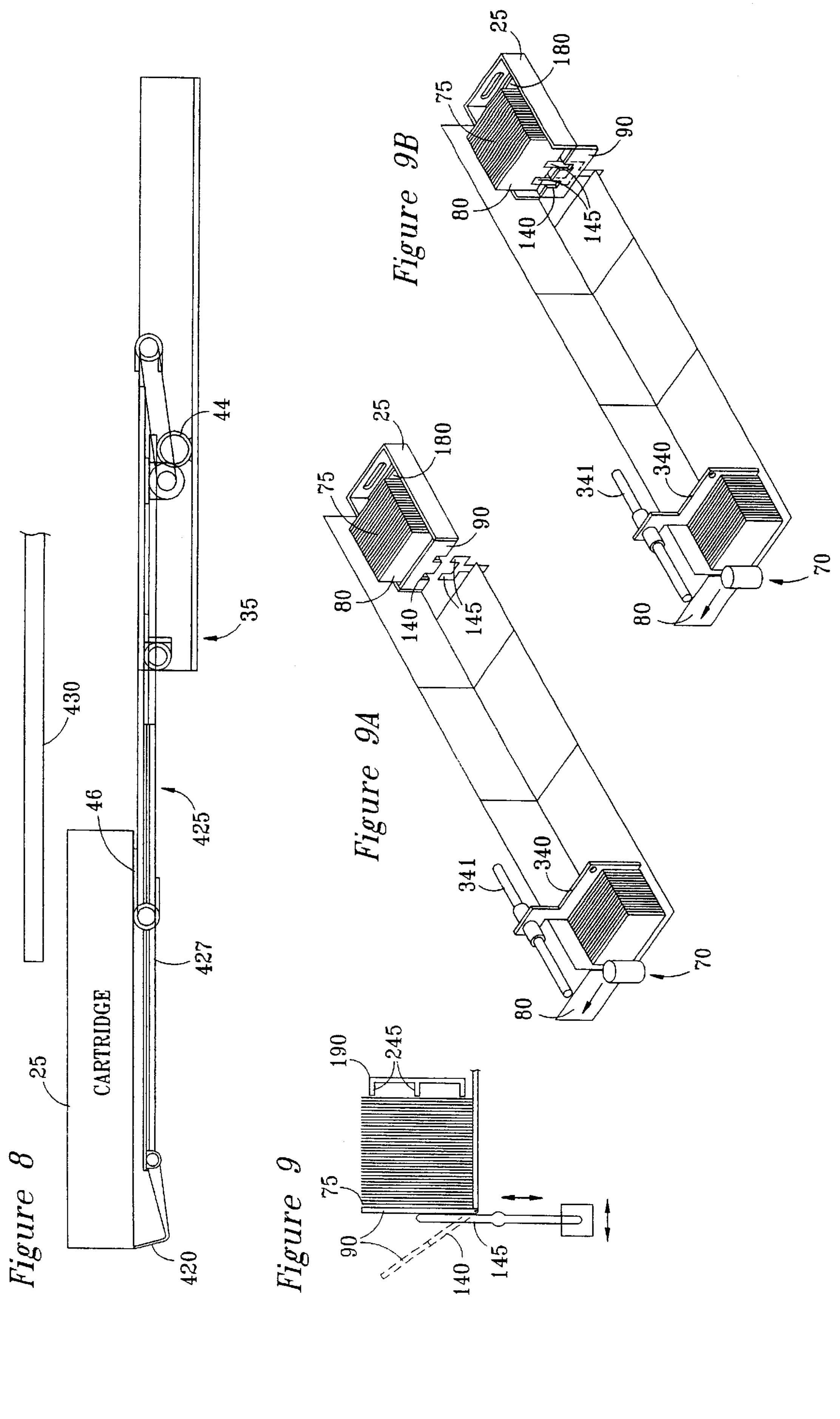
FIG. 8 is a side view, partly in phantom, of the cartridge support platform of FIG. 7 showing the extendible arm and stack support, with a release finger in the retracted position.
FIGS. 9 and 9A–9M are schematic illustrations of a sequence of operations for docking a cartridge to the autofeeder of FIG. 2, unloading a stack of mail, removing the cartridge, and queuing the stack of mail.

With reference now to FIG. 8, in order to securely grasp and hold the cartridges 25 during removal, insertion and transportation operations, the cartridge support platform 35 of the cartridge transfer and handling robot 30 includes the end-effector 425 including the pair of extensible support members 427, which are normally roughly parallel with a horizontal plane. These support members 427 arms are extended by operation of a servo motor 44 on the cartridge support platform 35, through a chain drive 46.

Each of the extensible support members 427 includes an L-shaped upstanding fingers 420 pivotally mounted at the end thereof. The upstanding fingers 420 are pivoted up and down by means of a worm gear drive, chain drive or other convenient means (not shown), driven by a servo motor (not shown) under computer control.

The cartridge support platform 35 also includes the separate end-actuator 430 driven by a servo motor, for operatively pivoting the sweep gate 400.

Operation of Cartridge Transfer and Handling Robot

The operation of the cartridge transfer and handling robot 30 to transfer cartridges 25 between the sorter output compartments 20, the docking station 55, and the compartments 45 of the buffer shelf 40 will now be described, with primary reference to FIGS. 11A–L.

Figure 11A:
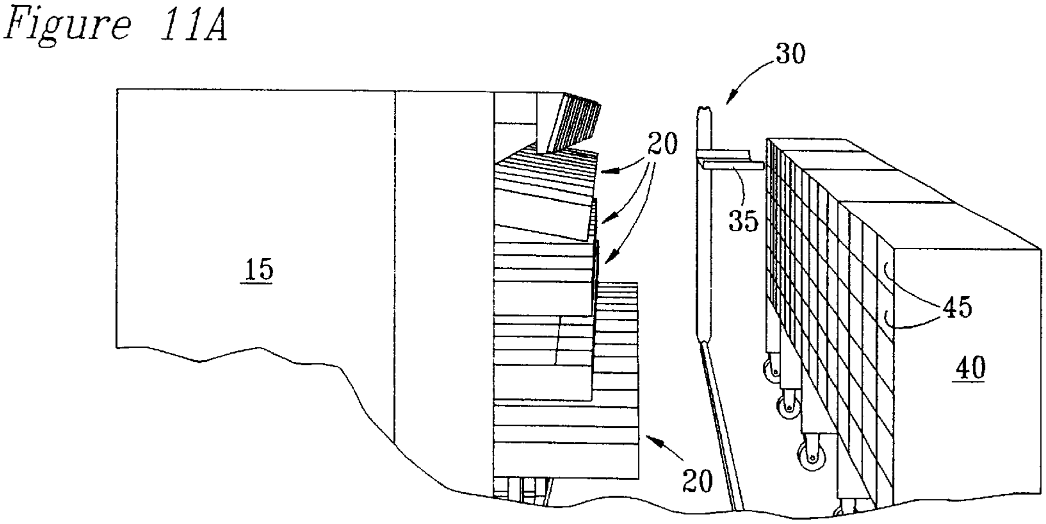
FIGS. 11A–11L illustrate a sequence of operations for the robotic cartridge handling and transfer apparatus of FIG. 6 moving cartridges between a buffer shelf, the autofeeder of FIG. 2, and the output compartments of a sorter of the mail sorting machine of FIG. 1.
Figure 11B:
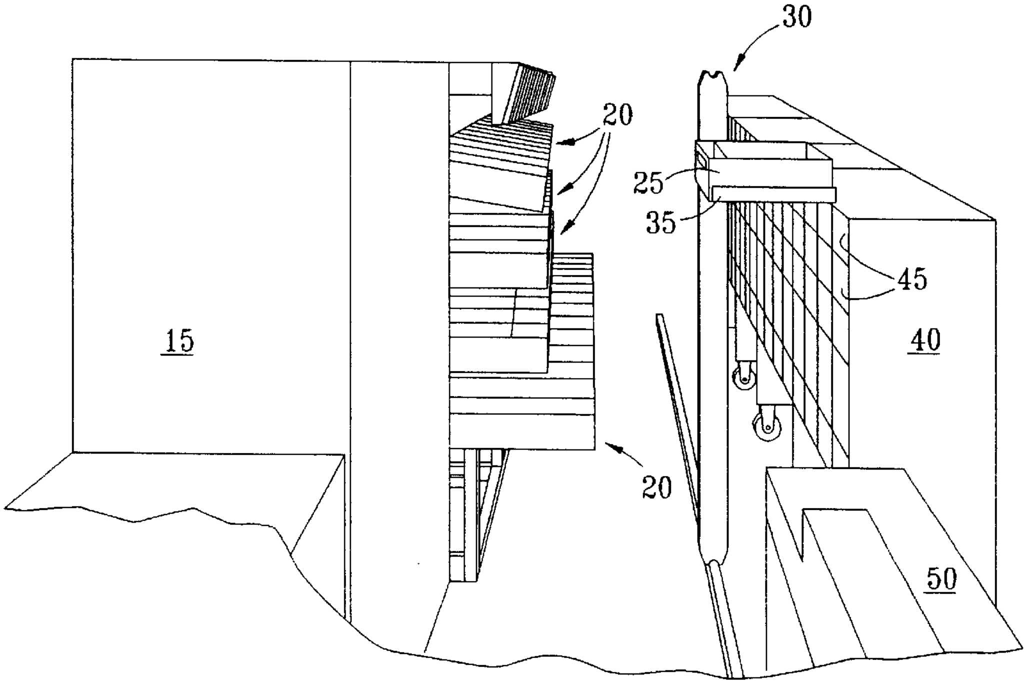
Figure 11C:
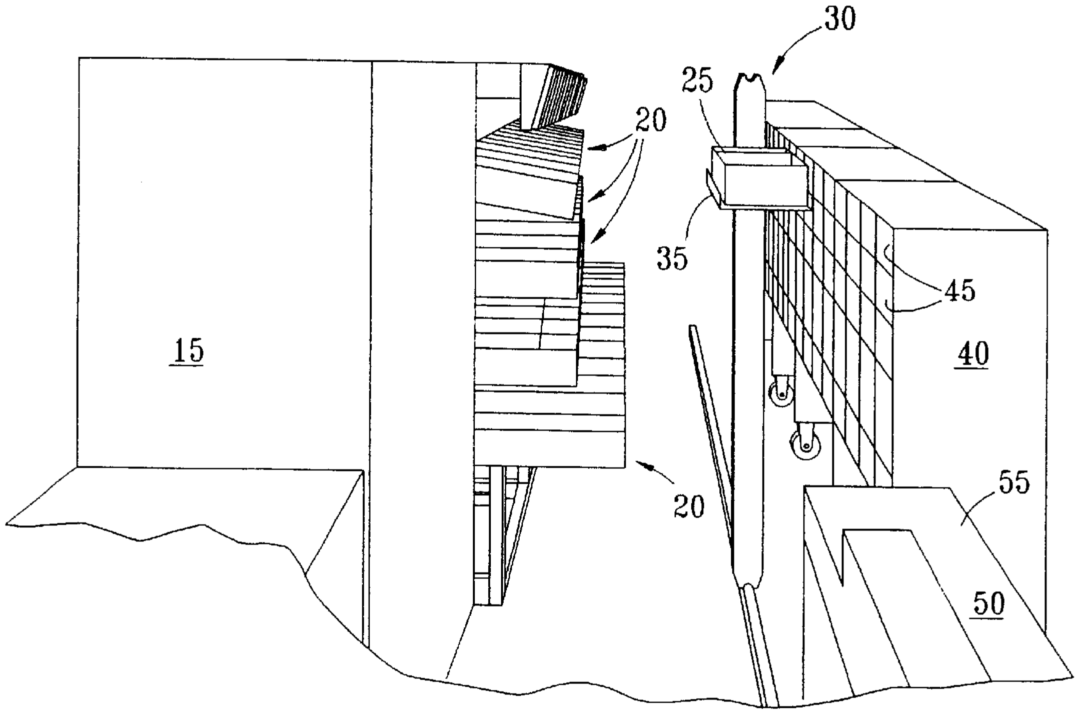

FIG. 11A shows the cartridge transfer and handling robot 30 in the "home" position, without a cartridge. In FIG. 11B, the robot 30 has extracted a full cartridge 25 from a compartment 45 of the buffer shelf 40 (for clarity, the stack of flat articles or mail is not shown). As depicted in FIG. 11C, the X—Y servo motors are actuated to rotate the robot 30 toward the docking station 55 of feeder assembly 50, for resorting. Alternatively, the robot 30 extracts filled cartridges from the buffer shelf 40, for transfer to the feeder assembly 50, or empty cartridges for transfer to an output compartment 20.

Figure 11D:
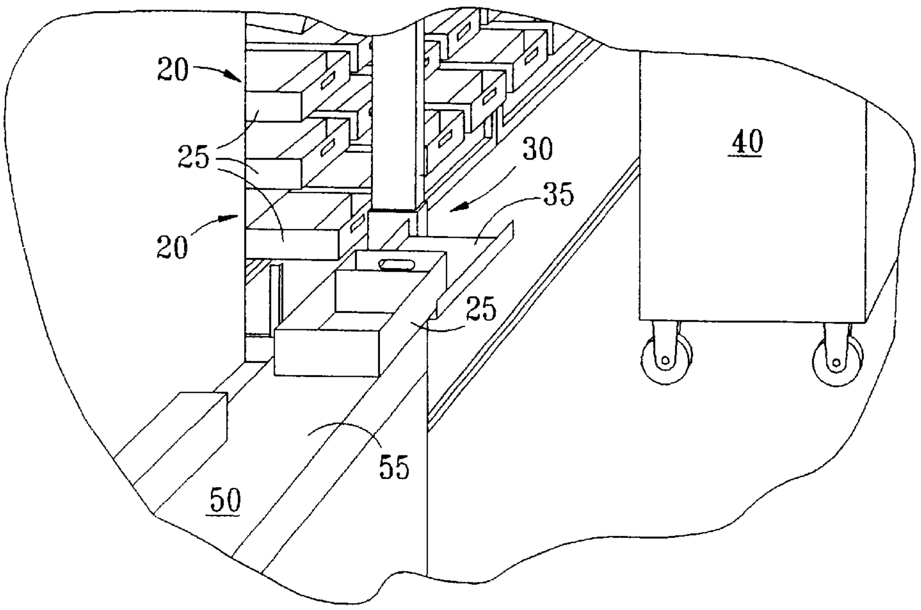
Figure 11E:
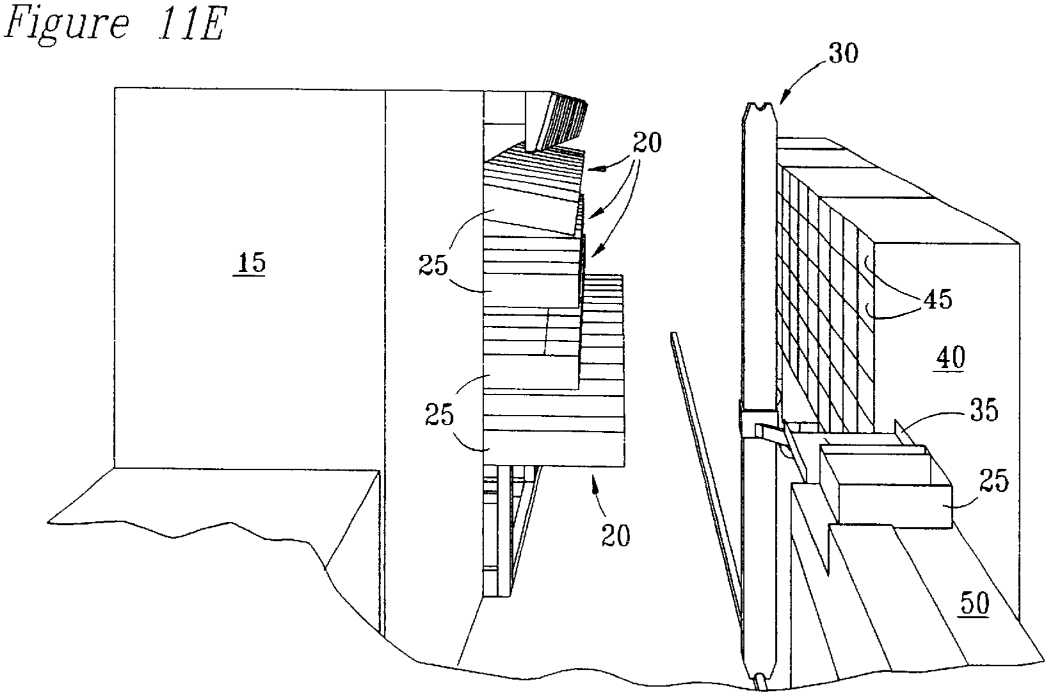
Figure 11F:
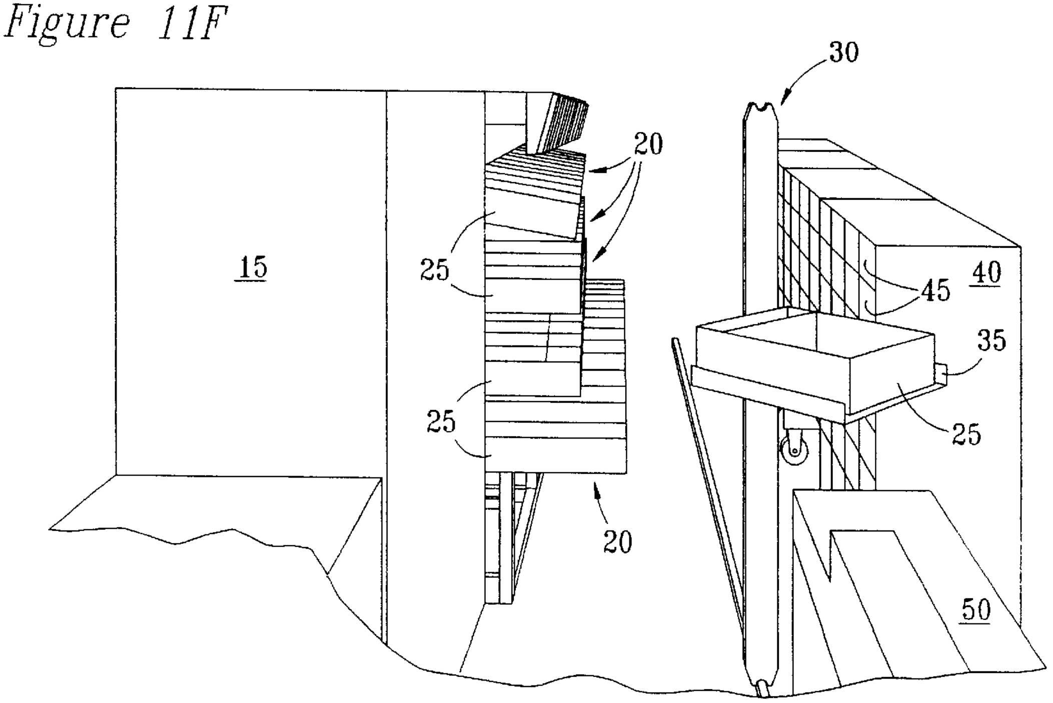
Figure 11G:
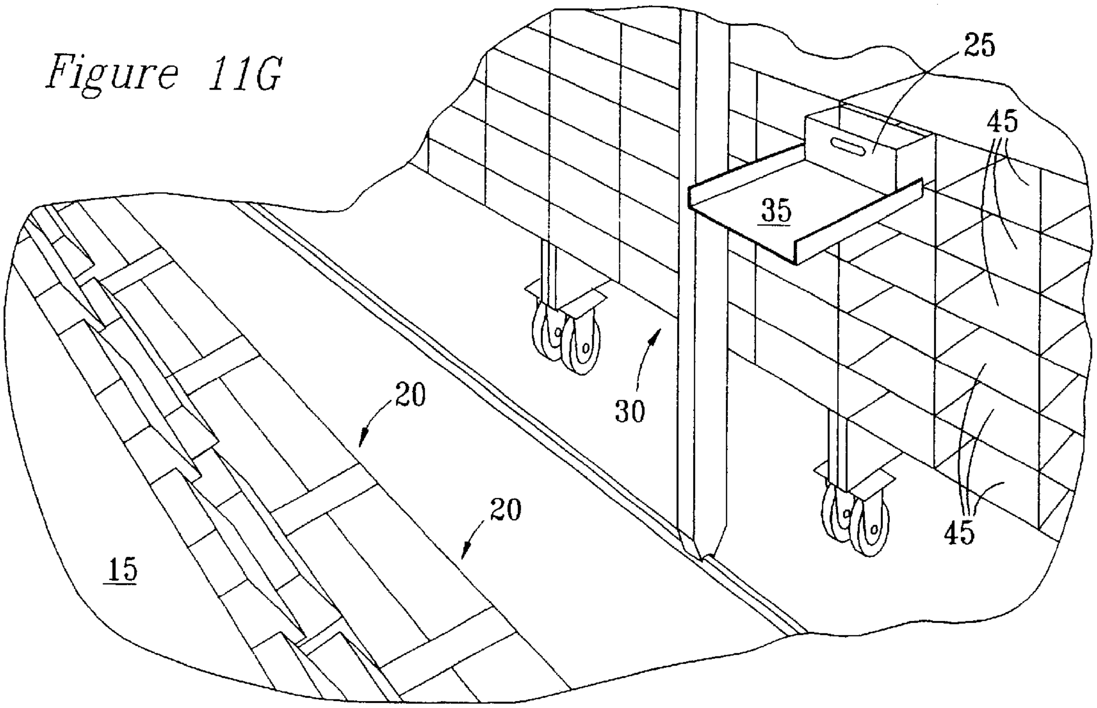

As illustrated in FIG. 11D, the servo motors are actuated to lower the platform 35 and push the cartridge 25 onto the docking station 55, by means of end effector 425 and support members 427. As depicted in FIG. 11E, the cartridge 35 has been inserted into the docking station 55. After the cartridge 25 has been unloaded at the docking station 55, the robot 30 removes the empty cartridge, as illustrated in FIG. 11F. If not presently needed, the empty cartridge can now be temporarily stored in a compartment 45 of buffer shelf 40, as depicted in FIG. 11G.

Figure 11H:
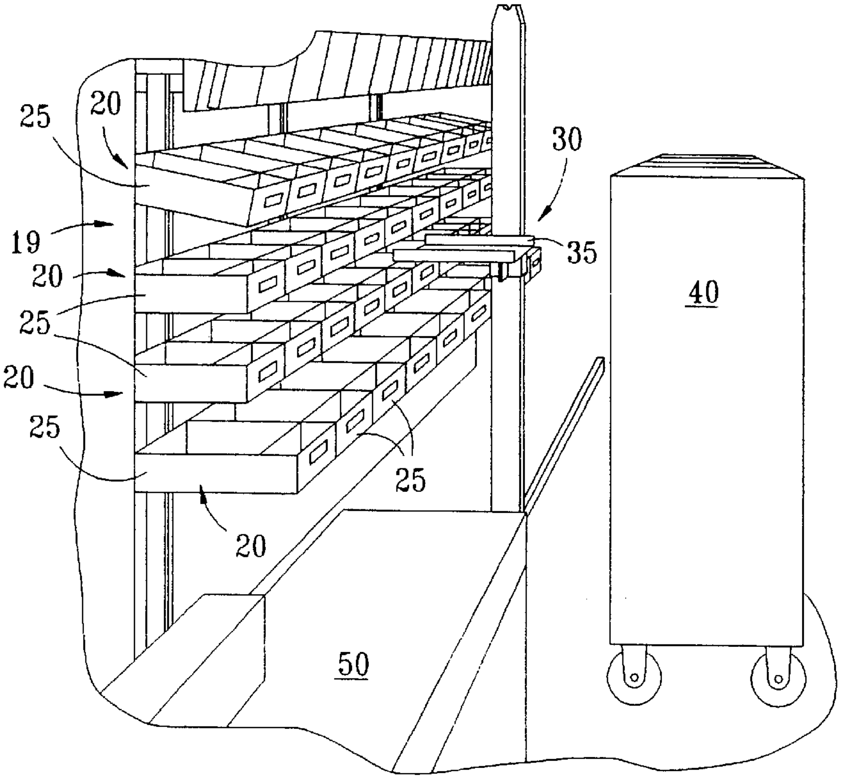
Figure 11I:
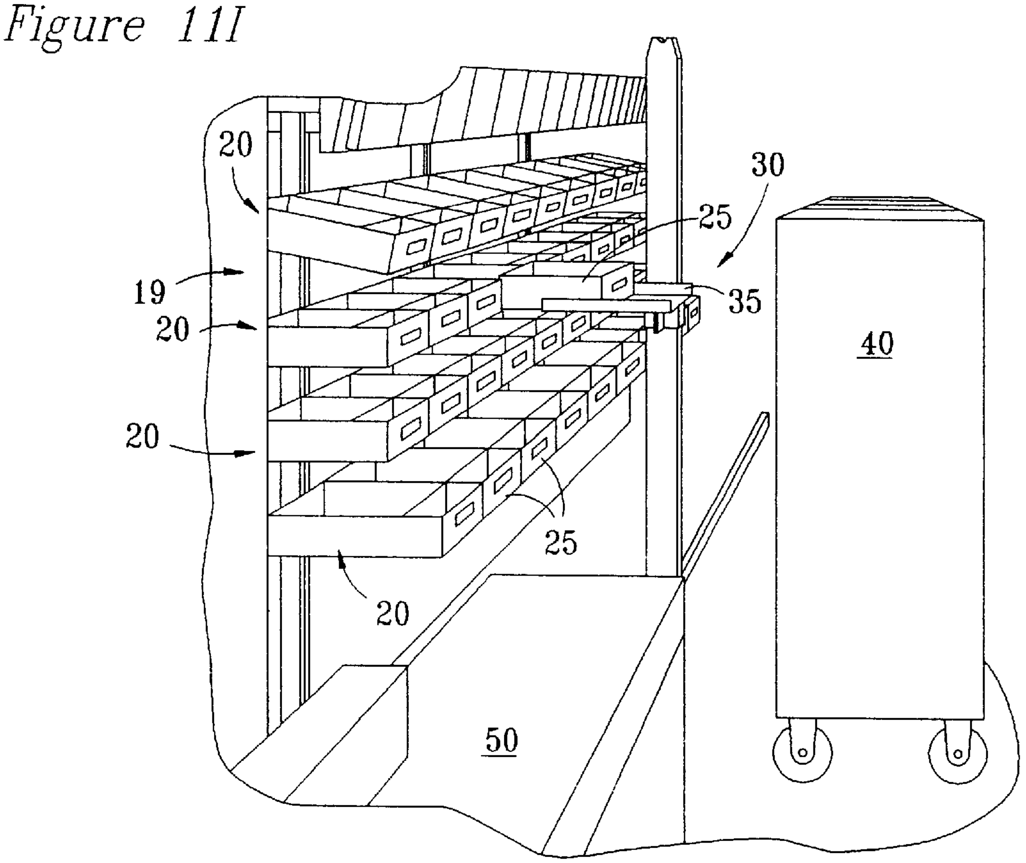
Figure 11J:
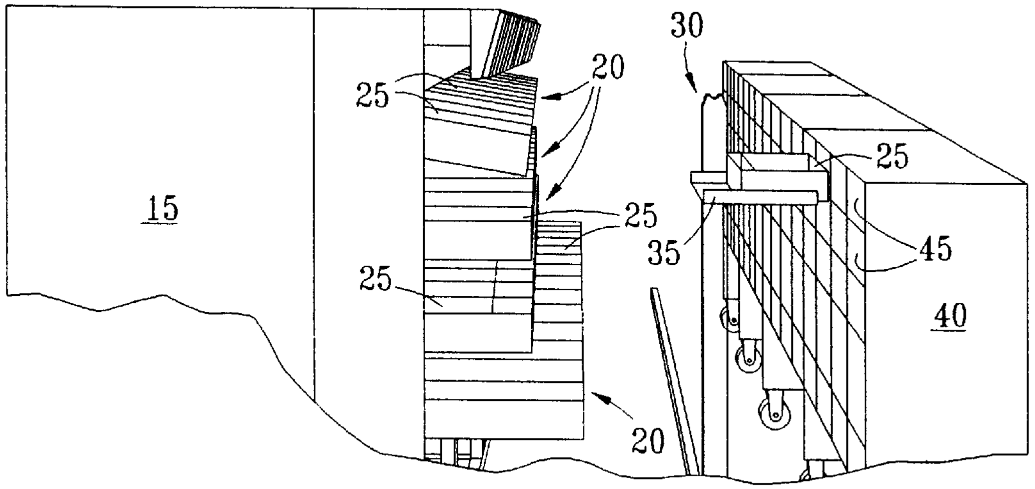
Figure 11K:
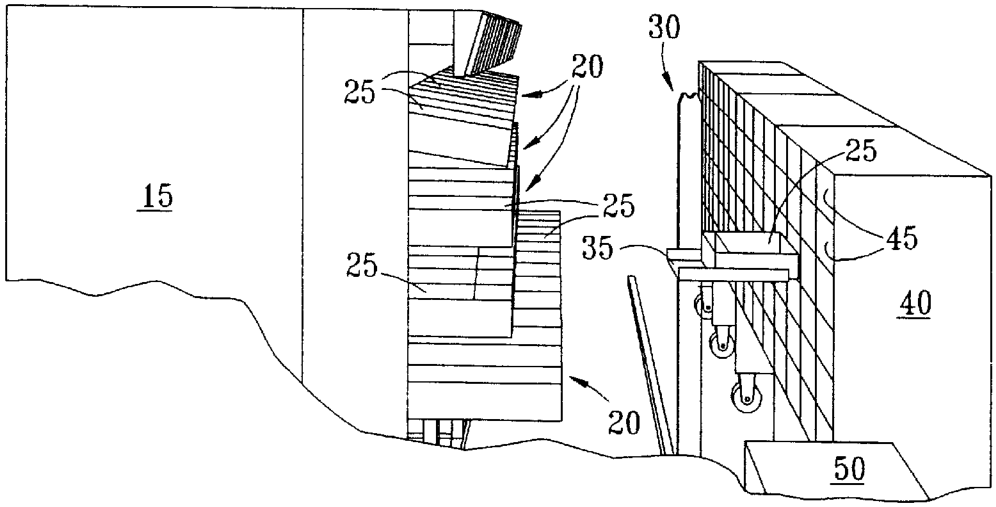
Figure 11L:
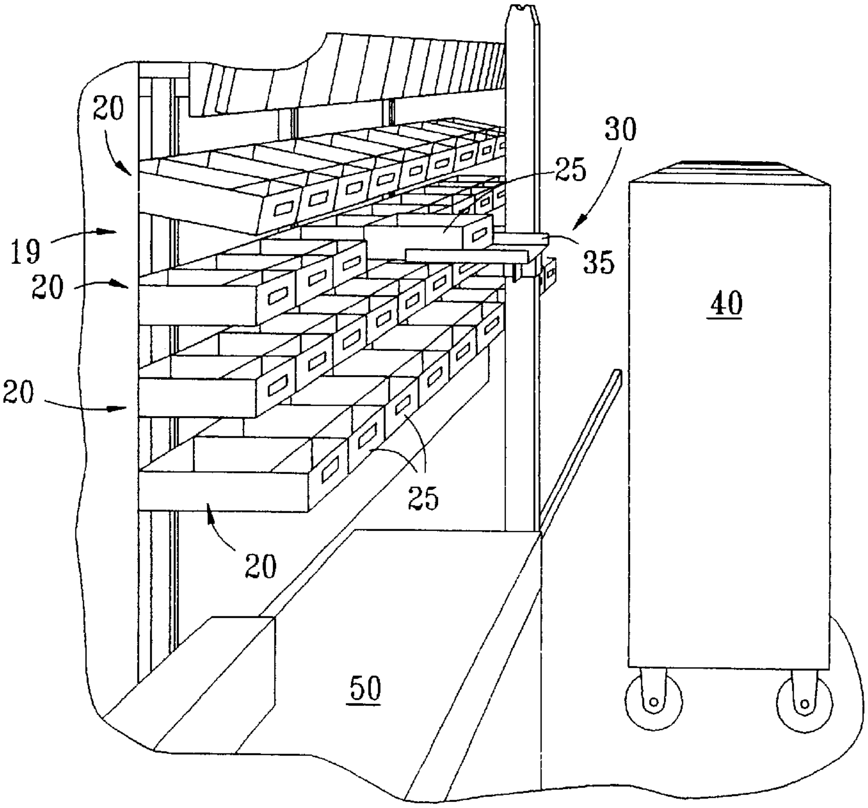

Referring to FIG. 11H, the robot 30 has been repositioned to remove a filled cartridge 25 from an output compartment 20 of array 19. FIG. 11I shows the robot 30 removing a full cartridge 25 (the stack of flat articles or mail is not shown). FIG. 11J depicts the robot 30 after having been turned and beginning the operation to place the cartridge 25 into a compartment 45 of buffer shelf 40. FIG. 11K illustrates the robot 30 in the middle of removing a cartridge 25 from a buffer shelf 40. Finally, FIG. 11L depicts the robot 30 in the process of putting a cartridge into a compartment 20 of array 19.

The preferred method of operation is to move filled cartridges from the buffer shelf 40 to the feeder system 55; empty cartridges from the feeder to the buffer; empty cartridges from the buffer 40 to the output compartments 20; filled cartridges from the output compartments 20 to the buffer 40; and so on. Thus, the buffer 40 preferably serves as an intermediate "stopover" point between the feeder and the output compartments, and from the output compartments to the feeder. If the supervisory computer determines, however, that a particular cartridge transfer will be more efficient if made directly, without the intermediate step of the buffer, the robot will transfer filled or empty cartridges directly between the feeder and the output compartment, and vice versa.

Although not shown in FIGS. 11A–11L, it is to be understood that, when the cartridge support platform 35 is properly positioned, the upstanding fingers 420 are lowered (or raised), and the extensible support members 427 extended (or retracted) as necessary, to position the upstanding fingers 420 directly underneath mating notches 160 in the front end of the cartridge 25, and to move the fingers 420 up into the notches 160 in the cartridge 25, at the appropriate times, as previously described.

It should be noted that, if the upstanding fingers 420 are sufficiently long, the hold bars 145 in the docking station 55 may be dispensed with in as much as the fingers also prevent the stack from falling with the cartridge door 90 open, in the same manner that the fingers 420 function in removing a filled cartridge from the output compartment 20. However, for reasons of maximum utilization of the robot 30, it is preferred that the hold bars 145 are used to support the mail during opening of the cartridge door 90, since this allows the robot to leave the docking station 55 immediately after discharging the cartridge 25, before it is docked and unloaded, if desired.

As can be seen in FIG. 11A–11L, some embodiments of the output array 19 of output compartments 20 may include a top row or tier that is slanted downwardly a few degrees. The reason for the slant is to facilitate manual removal of mail and/or cartridges from the top tier when manual removal of the cartridges is desired or necessary in case of breakdowns of the cartridge handling robot 30. Mail must continue to be processed regardless of a breakdown of the cartridge transfer and handling robot 30, and many such slanted tier arrays are already in operation. Thus, it is desirable that the cartridge transfer and handling robot 30 be able to accommodate such a slanted configuration. To do so, the cartridge support assembly is mounted to the collar having a mount rotatable to about a horizontal axis. The rotation is effected by means of a servo motor, under computer control, permitting the end-effector 425 to reach the slanted top shelf.

Figure 14:
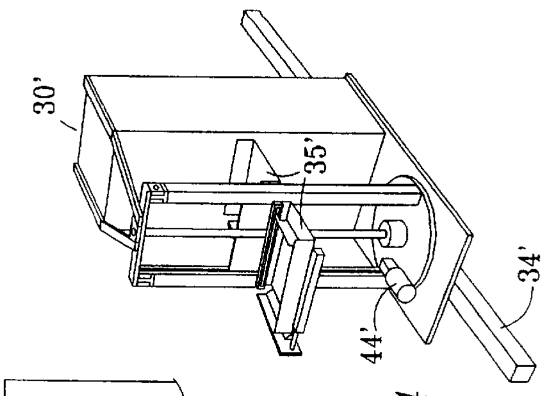
FIG. 14 is a perspective view of an X—Y robotic cartridge transfer support platform for the apparatus of FIG. 6, having dual cartridge support platforms.
Figure 15:
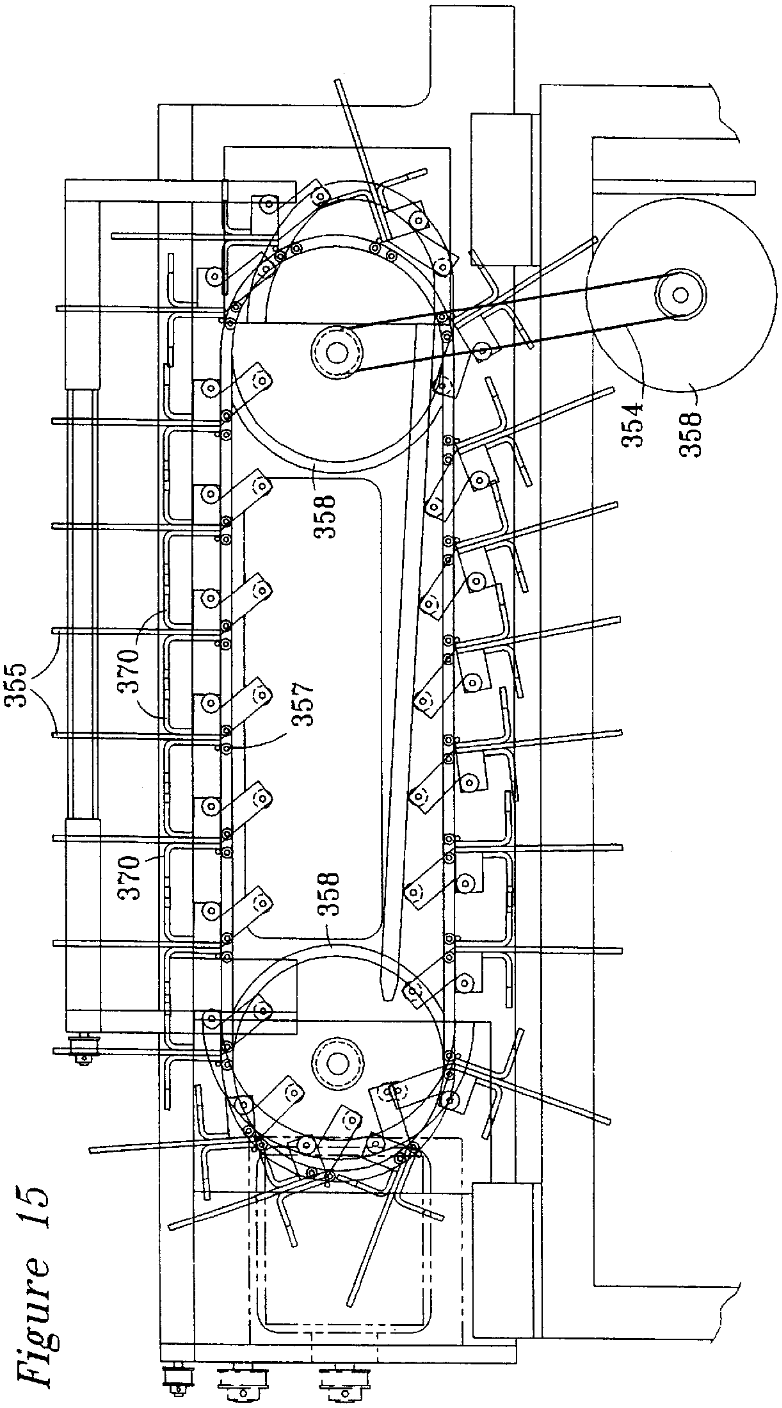
FIG. 15 is a side view, partly in phantom, of a feed-through jogger for use in connection with the mail sorting machine of FIG. 1.

Referring to FIG. 14, in order to speed up the cartridge insertion and removal process, a dual platform robot 30', riding on a bottom rail 34', is provided, configured with dual cartridge support platforms 35'. By the use of dual cartridge support platforms 35', the robot 30' is configured to insert and/or remove two cartridges per "trip", thus maximizing the efficiency of use of the robot 30'.

In order to maximize the usefulness of the sorter 15, in accordance with the present invention, a computer is suitably programmed so that, when the cartridge 25 in a designated output compartment has been filled or nearly filled, as indicated by the sensed position of the rear stack support paddle 180, or during the process of removal of a cartridge, prior to insertion of an empty cartridge, the computer automatically instructs the sorter 15 or a supervisory computer to redesignate another output compartment 20, on the fly, to enable the sorter to continue to sort to the redesignated output location until an empty cartridge is fully reinserted into the output compartment.

The supervisory computer is also preferably programmed to determine high—occurrence output compartments, either based upon manual input of a probability mapping for the sort locations, or based upon "learning" the probability of the various sort locations based upon recording of information from prior sorts. The high—occurrence destinations are grouped together in the array 19, and in buffer shelf 40, to maximize efficiency of cartridge insertion, removal, and transfer between the buffer shelf 40, the array 19, and the docking station 55 of feeding assembly 50.

It should be noted that, although the invention is illustrated and described in conjunction with a sorter, the invention is useful in connection with other machines for automatically handling and/or processing flat articles and mail, for example, envelope addressing machines, labeling machines, character recognition machines, and bar code printing machines.

Although preferred and alternate embodiments of the present invention have been illustrated in the accompanying drawings and described in the foregoing DETAILED DESCRIPTION, it will be understood that the invention is not limited to the embodiments disclosed, but is capable of numerous rearrangements, modifications and substitutions of parts and elements without departing from the spirit of the invention.

We claim:

1. A sorting system for flat articles comprising:

a plurality of cartridges each sized to hold a stack of the flat articles, each cartridge including a bottom, sidewalls, and a pivotable door mounted to the sidewalls, the cartridge including a latch for securing and releasing the door and at least one actuating member for opening the door, an array of output compartments, each output compartment being configured to receive and support a cartridge and including a projection for engaging and unlocking the latch as a cartridge is inserted into the compartment, and at least one cam member for engaging the door actuating member and opening the door as the cartridge is positioned in the compartment to receive sorted articles, the array of output compartments being arranged in rows and columns;

means for sorting flat articles into selected ones of the compartments, the flat articles being received in cartridges positioned in the output compartments;

a transfer robot, the transfer robot including a vertical support column mounted on a rail for horizontal movement along the length of the array, a first motor coupled to the transfer robot for moving the robot along the rail, a cartridge support platform mounted on the support column for vertical movement along the support column, a second motor coupled to the support platform for moving the platform vertically along the support column, the cartridge support platform including an end effector operative to insert a cartridge into a compartment and extract a cartridge from a compartment, an actuator for actuating the end effector, an extensible support for supporting cartridges as the cartridges are inserted and removed and an actuator for actuating the extensible support;

a sensor, the sensor detecting when a cartridge positioned in a compartment is substantially full of flat articles and generating a signal indicating that the cartridge is substantially full; and a supervisory computer being programmed to direct the transfer robot to remove the cartridge from the compartment in response to the signal indicating the cartridge is full.

2. The system of claim 1 further comprising a plurality of buffer shelves configured to receive cartridges removed from the output compartments by the transfer robot.

3. The system of claim 2 wherein the supervisory computer being programmed to direct the transfer robot to remove a cartridge from a compartment and transfer the cartridge to a buffer shelf in response to a signal indicating the cartridge is full.

4. The system of claim 2 wherein a docking station comprises at least one hold bar and an actuator therefor and the door of the cartridge further comprises notches to receive the hold bars when the cartridge is inserted in the docking station, the hold bars retaining a stack of mail in the cartridge as the cartridge door is opened.

5. The system of claim 1 wherein the cartridge further comprises a stack support, the stack support supporting flat items positioned in the cartridge and being slidable along a length of the cartridge and wherein the system further comprising a docking station for receiving flat articles from a cartridge presented by the transfer robot and unloading flat articles, the docking station including being configured to receive and support a cartridge and including a projection for engaging and unlocking the latch as a cartridge is inserted into the docking station, at least one cam member for engaging the door actuating member and opening the door as the cartridge is positioned in the docking station and a pusher for pushing the stack support and flat items supported by the stack support along the length of the cartridge so as to discharge a stack of flat items from the cartridge.

6. The system of claim 1 wherein the robot moves along the rail to access cartridges positioned in the array of compartments and the buffer shelves.

7. The system of claim 1 further comprising means for detecting when a cartridge becomes substantially full of articles and means for causing the robot to remove that cartridge and transfer it to a buffer shelf while discontinuing sorting of articles to that cartridge.

8. The system of claim 1 wherein the transfer robot is mounted between an upper and lower rail.

9. The system of claim 8 wherein the transfer robot is connected to the first motor with a cable for moving the robot horizontally along the rail.

10. The system of claim 8 wherein the cartridge support platform is connected to the second motor with a cable for moving the cartridge support platform vertically along the support column.

11. The system of claim 1 wherein the cartridge further comprises at least one mating notch and wherein the extensible support further comprises a finger for engaging the mating notch when the robot engages the cartridge.

12. The system of claim 1 wherein the robot is equipped with a pair of cartridge support platforms.

13. The system of claim 1 wherein each compartment is provided with a sweeper gate and wherein the transfer robot is provided with an end actuator to pivot the sweeper gate between the first position wherein the sweeper gate being open in the first position to guide flat articles from the sorter means into a cartridge positioned in the compartment and a second, closed position for extraction of a cartridge from the compartment.

14. The system of claim 13 further comprising a motor for driving the end actuator and wherein the end acutator is moveably attached to the support platform and extends to engage and close the sweep gate to push flat articles into the cartridge.

15. The system of claim 1 further comprising a motor for driving the end actuator and wherein the end acutator is moveably attached to the support platform and extends to engage and close the sweep gate to push flat articles into the cartridge.

16. A sorting system for flat articles comprising:

a plurality of cartridges each sized to hold a stack of the flat articles, each cartridge including a bottom, sidewalls, and a pivotable door mounted to the sidewalls, the cartridge including a latch for securing and releasing the door and at least one actuating member for opening the door;

an array of output compartments, each output compartment being configured to receive and support a cartridge and including a projection for engaging and unlocking the latch as a cartridge is inserted into the compartment, and at least one cam member for engaging the door actuating member and opening the door as the cartridge is positioned in the compartment to receive sorted articles, the array of output compartments being arranged in rows and columns;

means for sorting flat articles into selected ones of the compartments, the flat articles being received in cartridges positioned in the output compartments;

robot means operative to insert a cartridge into a compartment and extract a cartridge from a compartment;

means for detecting when a cartridge positioned in a compartment is substantially full of flat articles and generating a signal indicating that the cartridge is substantially full; and computer means programmed to direct the robot means to remove the cartridge from the compartment in response to the signal indicating the cartridge is full.

17. The system of claim 16 wherein the cartridge means includes slidable support means, the support means supporting flat items positioned in the cartridge and being slidable along a length of the cartridge.

18. The system of claim 16 further comprising a docking station for receiving flat articles from a cartridge presented by the transfer robot and unloading flat articles, the docking station including being configured to receive and support a cartridge and including means for engaging and unlocking the latch as a cartridge is inserted into the docking station, means for engaging the door actuating member and opening the door as the cartridge is positioned in the docking station and means for pushing the stack support and flat items supported by the stack support along a length of the cartridge so as to discharge a stack of flat items from the cartridge.

19. The system of claim 18 further comprising means for enabling the robot means to access cartridges positioned in the array of compartments, buffer shelves, and the docking station.

20. The system of claim 18 wherein the means for enabling the robot means to access cartridges positioned in the array of compartments, buffer shelves and docking station includes an upper and lower rail and means for driving the robot means along the upper and lower rails.

21. The system of claim 16, wherein each compartment is provided with gate means and wherein the robot means is provided with means for moving the gate means between a first position wherein the gate means guides flat articles from the sorting means into a cartridge positioned in the compartment and a second, closed position for extraction of a cartridge from the compartment.

* * * * *

UNITED STATES PATENT AND TRADEMARK OFFICE

CERTIFICATE OF CORRECTION

PATENT NO. : 6,390,756 B1
DATED : May 21, 2002
INVENTOR(S) : Isaacs et al.

It is certified that error appears in the above-identified patent and that said Letters Patent is hereby corrected as shown below:

<u>Column 21,</u>
Line 49, delete "being";
Line 53, delete "a" and insert -- the -- after "wherein" and before "docking";
Line 61, delete "a" and insert -- the -- after "along";

<u>Column 23,</u>
Line 11, delete "a" and insert -- the -- after "along" and before "length";

<u>Column 24,</u>
Line 1, delete "a" and insert -- the -- after "along" and before "length"; and
Line 16, delete "sorting" and insert -- sorter -- after "the" and before "means".

Signed and Sealed this

Twentieth Day of August, 2002

*Attest:*

JAMES E. ROGAN

*Attesting Officer*

*Director of the United States Patent and Trademark Office*